(12) United States Patent
Verma et al.

(10) Patent No.: US 10,772,099 B2
(45) Date of Patent: Sep. 8, 2020

(54) PUNCTURED SOUNDING AND PARTIAL BANDWIDTH FEEDBACK

(71) Applicant: QUALCOMM Incorporated, San Diego, CA (US)

(72) Inventors: Lochan Verma, San Diego, CA (US); Bin Tian, San Diego, CA (US); Sameer Vermani, San Diego, CA (US); Lin Yang, San Diego, CA (US); Jialing Li Chen, San Diego, CA (US); Youhan Kim, Saratoga, CA (US)

(73) Assignee: QUALCOMM Incorporated, San Diego, CA (US)

( * ) Notice: Subject to any disclaimer, the term of this patent is extended or adjusted under 35 U.S.C. 154(b) by 90 days.

(21) Appl. No.: 16/276,137

(22) Filed: Feb. 14, 2019

(65) Prior Publication Data

US 2019/0261369 A1 Aug. 22, 2019

Related U.S. Application Data

(60) Provisional application No. 62/660,128, filed on Apr. 19, 2018, provisional application No. 62/710,596, filed on Feb. 16, 2018.

(51) Int. Cl.
*H04W 4/00* (2018.01)
*H04W 72/04* (2009.01)
(Continued)

(52) U.S. Cl.
CPC ...... *H04W 72/0453* (2013.01); *H04B 7/0617* (2013.01); *H04B 7/0619* (2013.01);
(Continued)

(58) Field of Classification Search
None
See application file for complete search history.

(56) References Cited

U.S. PATENT DOCUMENTS

2005/0251721 A1* 11/2005 Ramesh ............... H04L 1/1614
714/748
2009/0073922 A1* 3/2009 Malladi ................ H04L 1/1664
370/328
(Continued)

FOREIGN PATENT DOCUMENTS

WO 2008120925 10/2008

OTHER PUBLICATIONS

"PCT Application No. PCT/US2019/018205 International Search Report and Written Opinion", dated May 20, 2019, 12 pages.

*Primary Examiner* — Elisabeth Benoit Magloire
(74) *Attorney, Agent, or Firm* — Qualcomm Inc. (DL)

(57) ABSTRACT

This disclosure provides systems, methods, and apparatus, including computer programs encoded on computer-readable media, for partial bandwidth feedback based on punctured sounding. Punctured sounding is used by a transmitting device that omits portions of a channel bandwidth based on a puncturing pattern. The puncturing pattern may be based on an exclusion bandwidth zone to avoid transmissions on portions of channels that may interfere with an incumbent system transmission. The puncturing pattern may be indicated in a null data packet announcement (NDPA) to inform the receiving device that a subsequent NDP will be punctured. The receiving device may determine the feedback by measuring the portions of the NDP that are not punctured. Beamforming may be enhanced by using punctured sounding between two beamforming endpoints.

30 Claims, 14 Drawing Sheets

(51) Int. Cl.
  *H04B 7/06*  (2006.01)
  *H04W 72/08*  (2009.01)
  *H04L 5/00*  (2006.01)
  *H04B 7/024*  (2017.01)

(52) U.S. Cl.
  CPC ......... *H04B 7/0632* (2013.01); *H04L 5/0023* (2013.01); *H04L 5/0048* (2013.01); *H04L 5/0094* (2013.01); *H04W 72/085* (2013.01); *H04B 7/024* (2013.01); *H04L 5/0035* (2013.01)

(56) References Cited

U.S. PATENT DOCUMENTS

| | | | |
|---|---|---|---|
| 2009/0274226 A1 | 11/2009 | Mondal et al. | |
| 2010/0135273 A1* | 6/2010 | Kim | H04L 1/0072 370/344 |
| 2010/0246561 A1* | 9/2010 | Shin | H04W 52/32 370/345 |
| 2011/0026419 A1* | 2/2011 | Kim | H04W 52/281 370/252 |
| 2011/0274063 A1* | 11/2011 | Li | H04L 5/0053 370/329 |
| 2012/0069793 A1 | 3/2012 | Chung et al. | |
| 2013/0223485 A1* | 8/2013 | Bai | H04L 1/1819 375/219 |
| 2017/0325202 A1 | 11/2017 | Verma et al. | |
| 2017/0367084 A1* | 12/2017 | Cheng | H04L 1/1854 |
| 2018/0262295 A1* | 9/2018 | Oketani | H04L 27/2602 |
| 2020/0059290 A1* | 2/2020 | Pan | H04B 7/088 |

* cited by examiner

PUNCTURED SOUNDING AND PARTIAL BANDWIDTH FEEDBACK

CROSS-REFERENCE TO RELATED APPLICATIONS

This Patent Application claims priority to U.S. Provisional Patent Application No. 62/710,596, filed Feb. 16, 2018 and U.S. Provisional Application No. 62/660,128, filed Apr. 19, 2018, both entitled "METHODS AND APPARATUS FOR CHANNEL STATE INFORMATION SOUNDING AND FEEDBACK," and assigned to the assignee hereof. The disclosures of the prior Applications are considered part of and are incorporated by reference in this Patent Application.

TECHNICAL FIELD

Certain aspects of the present disclosure generally relate to wireless communication, and more particularly, to punctured sounding and feedback in a wireless communication network.

DESCRIPTION OF THE RELATED TECHNOLOGY

Communications networks are used to exchange messages among several interacting spatially-separated devices. Networks may be classified according to geographic scope, which could be, for example, a metropolitan area, a local area, or a personal area. Such networks may be designated respectively as a wide area network (WAN), metropolitan area network (MAN), local area network (LAN), or personal area network (PAN). Networks also differ according to the switching/routing technique used to interconnect the various network nodes and devices (for example, circuit switching vs. packet switching), the type of physical media employed for transmission (for example, wired vs. wireless), and the set of communication protocols used (for example, Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, or other unlicensed frequency bands. Examples of unlicensed frequency bands may include 2.4 GHz frequency band (sometimes also referred to as an "industrial, scientific, and medical" or "ISM" frequency band) and a 5 GHz frequency band (sometimes also referred to as an "Unlicensed National Information Infrastructure" or "UNIT" frequency band). Technology specifications are being drafted for a 6 GHz frequency band. The 6 GHz frequency band may support the Institute of Electrical and Electronics Engineers (IEEE) 802.11 standard for communication as well as other wireless technologies. Wireless networks advantageously facilitate user mobility and rapid field deployment when compared to fixed wired networks.

The proposed 6 GHz unlicensed frequency band may be used by devices having different technology types. For example, in addition to IEEE 802.11 devices, the spectrum could be used by other technologies. One example of another technology being proposed is Long Term Evolution (LTE) for unlicensed spectrum which is being developed by the 3rd Generation Partnership Project (3GPP) standards-setting body. Other technologies may utilize the 6 GHz unlicensed frequency band, including Bluetooth', satellite, radar, terrestrial radio, cellular signals, or other technologies. To share the spectrum, one system (such as IEEE 802.11) should avoid transmitting in frequencies that are being used by an incumbent system. Current techniques for avoiding an incumbent system may be too restrictive. An enhanced transmission scheme may increase bandwidth and performance of IEEE 802.11 transmissions while concurrently avoiding frequencies used by an incumbent system.

Different schemes are being developed to address the issue of sharing the channel resources while avoiding frequencies used by an incumbent system. Furthermore, it is desirable to minimize the amount of traffic associated with determining and communicating channel state information. Meanwhile, the channel state information may be relevant in a wireless channel where portions of a frequency range are avoided due to the presence of an incumbent system.

SUMMARY

Various implementations of systems, methods and devices within the scope of the appended claims each have several aspects, no single one of which is solely responsible for the desirable attributes described herein. Without limiting the scope of the appended claims, some prominent features are described herein.

One aspect of the disclosure provides a method of wireless communication. For example, the method may be performed by a wireless local area network (WLAN) device which may be referred to as a transmitting device for purposes of this summary. The method may include transmitting, from the transmitting device to a receiving device, a first message that indicates a puncturing pattern that will be used to puncture a punctured sounding message via a wireless channel. The method may include transmitting, from the transmitting device to the receiving device, the punctured sounding message via the wireless channel. The punctured sounding message may omit portions of a signal on the wireless channel based on the puncturing pattern. The method may include receiving, from the receiving device, a feedback message that includes feedback information based on non-punctured portions of the punctured sounding message.

In some implementations, the puncturing pattern may include a disallowed subchannel bitmap that identifies which subchannels or resource units (RUs) are punctured.

In some implementations, the subchannels indicated in the puncturing pattern may be identified based on 20 MHz channels in a tone map for a frequency band.

In some implementations, the RUs indicated in the puncturing pattern may be identified based on groups of subcarriers in a tone map for a frequency band.

In some implementations, the method may include transmitting a management frame that indicates a puncturing pattern for the wireless channel. The management frame may be a beacon frame from an access point to one or more stations.

In some implementations, the feedback information may include beamforming feedback determined by the receiving device based on the punctured sounding message.

In some implementations, the beamforming feedback may be a compressed beamforming metric that is based on an average of signal to noise measurements for the non-punctured portions of the wireless channel.

In some implementations, the method may include, before sending the first message with the puncturing pattern, determining that the receiving device supports puncturing sounding.

In some implementations, determining that the receiving device supports puncturing sounding may include receiving a punctured sounding capability indicator from the receiving device.

In some implementations, the method may include determining a beamforming parameter for a subsequent data communication from the transmitting device to the receiving device based, at least in part, on the feedback information.

In some implementations, the first message may be a null data packet announcement (NDPA) and the punctured sounding message is a null data packet (NDP).

Another innovative aspect of the subject matter described in this disclosure can be implemented as a method of communication in a wireless network. For example, the method may be performed by a WLAN device which may be referred to as a receiving device for purposes of this summary. The method may include receiving, from a transmitting device by a receiving device, a first message that indicates a puncturing pattern that will be used to puncture a punctured sounding message via a wireless channel. The method may include receiving, from the transmitting device by the receiving device, the punctured sounding message via the wireless channel. The punctured sounding message omits portions of a signal on the wireless channel based on the puncturing pattern. The method may include transmitting, from the receiving device to the transmitting device, a feedback message that includes feedback information determined based on non-punctured portions of the punctured sounding message.

In some implementations, the puncturing pattern may include a disallowed subchannel bitmap that identifies which subchannels or resource units are punctured.

In some implementations, the subchannels indicated in the puncturing pattern may be identified either based on 20 MHz channels in a tone map for a frequency band or based on groups of subcarriers in a tone map for a frequency band.

In some implementations, method may include determining beamforming feedback based on the punctured sounding message. The method may include including the beamforming feedback in the feedback information.

In some implementations, the feedback information may include a compressed beamforming metric that is based on an average of signal to noise measurements for the non-punctured portions of the wireless channel.

In some implementations, the method may include transmitting, from the receiving device to the transmitting device, a punctured sounding capability indicator that indicates the receiving device supports punctured sounding.

Another innovative aspect of the subject matter described in this disclosure can be implemented in a WLAN device, such as a first wireless device for communication in a wireless network. The first wireless device may include a processor, memory in electronic communication with the processor, and instructions stored in the memory and executable by the processor. The instructions, when executed by the processor, may be configured to cause the first wireless device to output for transmission a first message to a second wireless device. The first message may indicate a puncturing pattern that will be used to puncture a punctured sounding message via a wireless channel. The instructions, when executed by the processor, may cause the first wireless device to output for transmission to the second wireless device the punctured sounding message via the wireless channel. The punctured sounding message omits portions of a signal on the wireless channel based on the puncturing pattern. The instructions, when executed by the processor, may cause the first wireless device to obtain from the second wireless device a feedback message that includes feedback information based on non-punctured portions of the punctured sounding message.

In some implementations, the puncturing pattern may include a disallowed subchannel bitmap that identifies which subchannels or resource units are punctured.

In some implementations, the subchannels indicated in the puncturing pattern may be identified either based on 20 MHz channels in a tone map for a frequency band or based on groups of subcarriers in a tone map for a frequency band.

In some implementations, the instructions may be further executable by the processor to cause the first wireless device to output for transmission a management frame that indicates a puncturing pattern for the wireless channel. The management frame may be a beacon frame from an access point to one or more stations.

In some implementations, the feedback information may include beamforming feedback determined by the second wireless device based on the punctured sounding message.

In some implementations, the beamforming feedback may be a compressed beamforming metric that is based on an average of signal to noise measurements for the non-punctured portions of the wireless channel.

In some implementations, the instructions may be further executable by the processor to cause the first wireless device to determine a beamforming parameter for a subsequent data communication from the first wireless device to the second wireless device based, at least in part, on the feedback information.

In some implementations, the first message may be a null data packet announcement (NDPA) and the punctured sounding message is a null data packet (NDP).

Another innovative aspect of the subject matter described in this disclosure can be implemented in a first wireless device for communication in a wireless network. The first wireless device may include a processor, memory in electronic communication with the processor, instructions stored in the memory and executable by the processor. The instructions, when executed by the processor, may be configured to cause the first wireless device to obtain a first message from a second wireless device. The first message may indicate a puncturing pattern that will be used to puncture a punctured sounding message via a wireless channel. The instructions, when executed by the processor, may be configured to cause the first wireless device to obtain from the second wireless device the punctured sounding message via the wireless channel. The punctured sounding message may omit portions of a signal on the wireless channel based on the puncturing pattern. The instructions, when executed by the processor, may be configured to cause the first wireless device to output for transmission to the second wireless device, a feedback message that includes feedback information determined based on non-punctured portions of the punctured sounding message.

In some implementations, the puncturing pattern may include a disallowed subchannel bitmap that identifies which subchannels or resource units are punctured.

In some implementations, the subchannels indicated in the puncturing pattern may be identified either based on 20 MHz channels in a tone map for a frequency band or based on groups of subcarriers in a tone map for a frequency band.

In some implementations, the instructions may be further executable by the processor to cause the first wireless device to determine beamforming feedback based on the punctured sounding message. The instructions, when executed by the processor, may be configured to cause the first wireless device to include the beamforming feedback in the feedback information.

In some implementations, the feedback information includes a compressed beamforming metric that is based on an average of signal to noise measurements for the non-punctured portions of the wireless channel.

Another aspect of the disclosure provides a non-transitory computer readable medium.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

DETAILED DESCRIPTION

Figure 1:
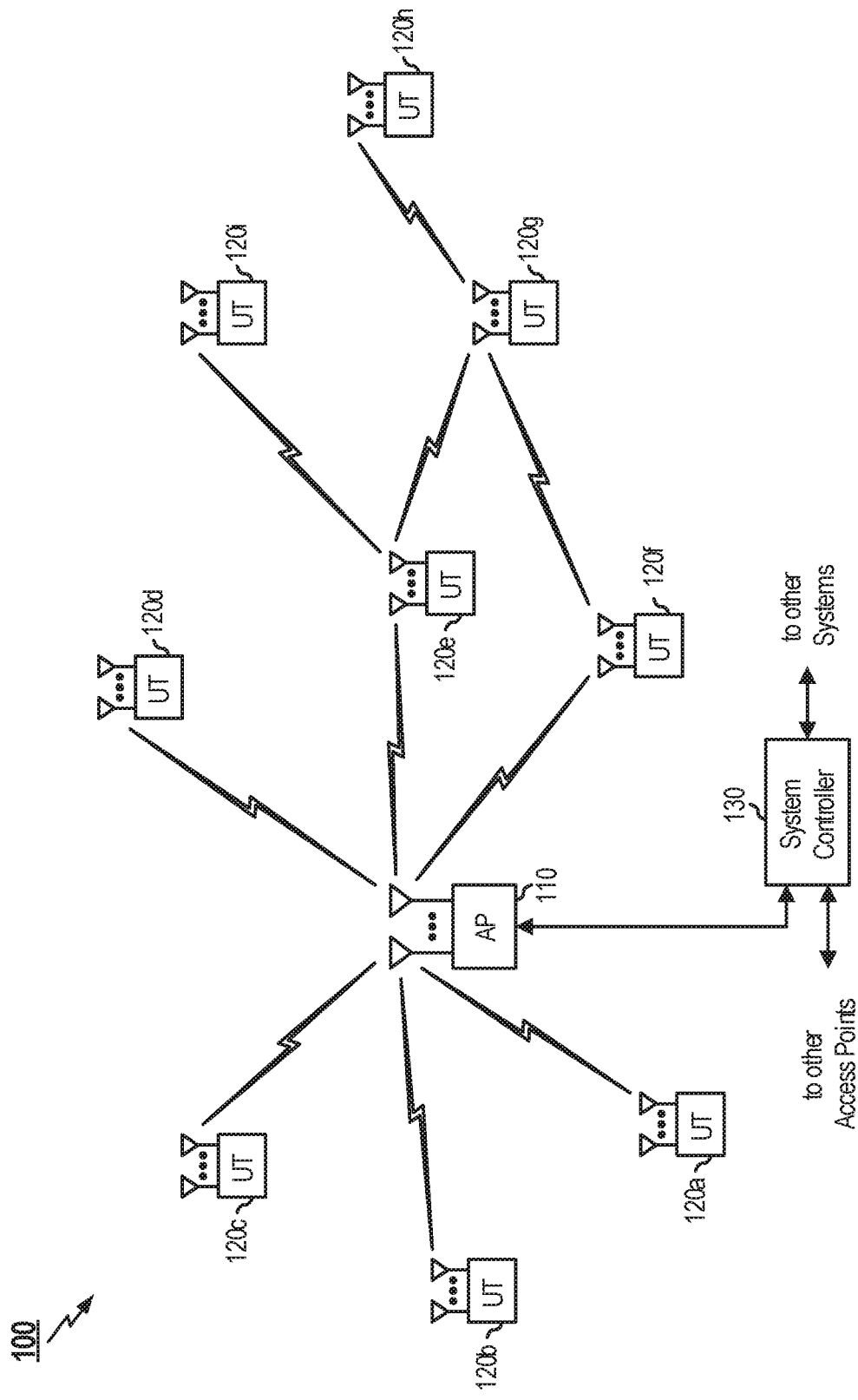
FIG. 1 illustrates a multiple-access multiple-input multiple-output (MIMO) system with access points and wireless communication devices.

The following description is directed to certain implementations for the purposes of describing the innovative aspects of this disclosure. Various aspects of the novel systems, apparatuses, and methods are described more fully hereinafter with reference to the accompanying drawings. The aspects disclosed may, however, be embodied in many different forms and should not be construed as limited to any specific structure or function presented throughout this disclosure. Rather, these aspects are provided so that this disclosure will be thorough and complete, and to convey the scope of the disclosure to those skilled in the art. The scope of the disclosure is intended to cover any aspect of the novel systems, apparatuses, and methods disclosed herein (and any equivalents thereof), whether implemented independently of or combined with any other aspect of the disclosure. For example, an apparatus may be implemented or a method may be practiced using any number of the aspects set forth herein. In some implementations the aspects of this disclosure may be implemented in any device, system or network that is capable of transmitting and receiving RF signals according to any wireless communication standards, including any of the Institute of Electrical and Electronics Engineers (IEEE) 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IoT) network, such as a system utilizing 3G, 4G, 5G, 6G, or further implementations thereof, technology. Wireless network technologies may include various types of wireless local area networks (WLANs). A WLAN may be used to interconnect nearby devices together, employing widely used networking protocols. The various aspects described herein may apply to any communication standard, such as Wi-Fi™ or, more generally, any member of the IEEE 802.11 family of wireless protocols. In some aspects, wireless signals may be transmitted according to a high-efficiency 802.11 protocol using orthogonal frequency-division multiplexing (OFDM), direct-sequence spread spectrum (DSSS) communications, multiple-access multiple-input multiple-output (MIMO), some combination thereof, or other schemes. Implementations of the high-efficiency 802.11 protocol may be used for Internet access, sensors, metering, smart grid networks, or other wireless applications. Advantageously, aspects of certain devices implementing this particular wireless protocol may consume less power than devices implementing other wireless protocols, may be used to transmit wireless signals across short distances, and/or may be able to transmit signals less likely to be blocked by objects, such as humans.

In some implementations, a WLAN includes various devices which are the components that access the wireless network. For example, there may be two types of devices: access points (APs) and clients (also referred to as stations (STAs)). In general, an AP serves as a hub or base station for the WLAN and an STA serves as a user of the WLAN. For example, a STA may be a laptop computer, a personal digital assistant (PDA), a mobile phone, etc. In an example, an STA connects to an AP via a Wi-Fi (for example, IEEE 802.11 protocol such as 802.11ah) compliant wireless link to obtain general connectivity to the Internet or to other wide area networks. In some implementations an STA may also be used as an AP.

In some implementations, an AP may comprise, be implemented as, or known as a NodeB, Radio Network Controller (RNC), eNodeB, Base Station Controller (BSC), Base Transceiver Station (BTS), Base Station (BS), Transceiver Function (TF), Radio Router, Radio Transceiver, Radio Base Station (RBS), or some other terminology. The basic building block of a WLAN conforming to the IEEE 802.11 family of standards in a Basic Service Set (BSS), which is managed by an AP. Each BSS is identified by a Basic Service Identifier (BSSID) that is advertised by the AP.

In some implementations, a STA may also comprise, be implemented as, or known as a user terminal, an access terminal (AT), a subscriber station, a subscriber unit, a mobile station, a remote station, a remote terminal, a user agent, a user device, user equipment, or some other terminology. In some implementations an access terminal may comprise a cellular telephone, a cordless telephone, a Session Initiation Protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (for example, a cellular phone or smartphone), a computer (for example, a laptop), a portable communication device, a headset, a portable computing device (for example, a personal data assistant), an entertainment device (for example, a music or video device, or a satellite radio), a gaming device or system, a global positioning system device, or any other suitable device that is configured to communicate via a wireless medium.

The concepts in this disclosure may be used with any unlicensed frequency band (or collection of unlicensed frequency bands). However, for brevity, this disclosure uses the 6 GHz unlicensed frequency band as an example for several of the Figures. Furthermore, this disclosure includes descriptions of IEEE 802.11 devices as an example. However, the techniques in this disclosure may be used with any wireless technology which can utilize combined channels. For brevity, this disclosure may describe enhanced IEEE 802.11ax or later generation IEEE devices which can transmit higher throughput by modulating data over a combined channel group consisting of multiple 20 MHz channels.

As described above, the 6 GHz frequency band is expected to be shared by a plurality of wireless communication systems. For brevity, this disclosure will describe a WLAN which is being operated in the 6 GHz frequency band that already has signals from other incumbent technologies (such as satellite, fixed microwave, or the like). The bandwidth occupied by the incumbent technology may be described as an exclusion bandwidth zone (which also may be referred to as an "Exclusion BW Zone"). In the various examples of this disclosure, one Exclusion BW Zone is described. However, there may be multiple Exclusion BW Zones that overlap channels in the 6 GHz frequency band. The devices of the WLAN should refrain from transmitting signals on the frequencies listed in the Exclusion BW Zone. There are many techniques for WLAN devices to be made aware of the Exclusion BW Zones operating in the 6 GHz frequency band in the geographic area of the WLAN. For example, an AP may inform the STAs of the Exclusion BW Zones. The Exclusion BW Zones may be pre-defined or may be detected during operation of the WLAN devices. The Exclusion BW Zones may be indicated in an Exclusion BW Zone list that is communicated to (or retrieved by) the WLAN devices.

WLAN devices operating in the 6 GHz band also are aware of the channel map for the frequency band. The channel map may include a list of operating channels, in which each channel is 20 MHz width increments. The IEEE 802.11 standard typically relies on 20 MHz channel sizes as a lowest increment of channel size. As WLAN technology has developed, it is possible for WLAN devices to combine channels into a group of channels for higher bandwidth transmissions. For example, IEEE 802.11n described the use of 2 channels (for a combined 40 MHz bandwidth) and defined a High Throughput (HT) transmission format. IEEE 802.11ac described the use of 8 channels (for a combined 160 MHz bandwidth) and defined a Very High Throughput (VHT) transmission format. IEEE 802.11ax also supports a combined 160 MHz bandwidth (which is a combination of 8 channels of 20 MHz width each). In IEEE 802.11ax, a transmission format may spread High Efficiency (HE) modulated symbols throughout the combined channel group. Later generations of IEEE 802.11 may increase the quantity of channels and techniques for modulating data via a group of channels. For example, Extremely High Throughput (EHT, which also may be referred to as XHT) may support 320 MHz channel groups (with 16 spatial streams) and enhanced modulation techniques. In several examples in this disclosure, techniques may be described in relation to EHT transmission format. However, the described concepts may be used by other transmission formats.

WLAN devices may be capable of avoiding (using channel puncturing) those subchannels that are occupied by an Exclusion BW Zone. For brevity, many of the examples in this disclosure describe full channel puncturing. However, the techniques in this disclosure may be used with full channel puncturing or partial channel puncturing. In full channel puncturing, an entire subchannel (from within the group of channels) may be zeroed out and that no preamble or data is transmitted on the subcarriers belonging to the punctured subchannel. Because the channel map for IEEE 802.11 devices has relied on 20 MHz channel sizing, full channel puncturing typically involves avoiding any 20 MHz subchannel that overlaps an Exclusion BW zone. However, in some implementations, the Exclusion BW Zone may be a different size (such as smaller) than the 20 MHz channel size. Furthermore, the Exclusion BW Zone boundaries may not align with the 20 MHz channel boundaries. Thus, a WLAN device may utilize partial channel puncturing (which also may be referred to as "sub-20 MHz puncturing"). Using partial channel puncturing, channels can be partially punctured, while the remaining portions of the channel that are not affected by the Exclusion BW Zone can be used for transmitting modulated data (such as HE or EHT modulated signals).

Various implementations of this disclosure relate generally to sounding and feedback when using punctured channels. Sounding may include triggered sounding or non-triggered sounding messages which can be used to determine channel quality. In this disclosure, the sounding messages may be punctured based on a pattern that reflects the channel puncturing. The feedback associated with the sounding also may take into account the channel puncturing. In some implementations, the puncturing pattern may be communicated between endpoints so that the sounding and feedback messages use the same puncturing pattern. Furthermore, some implementations of this disclosure relate to beamformed transmissions between a beamforming transmitter and a beamformee receiver. The beamformed transmissions also may adhere to punctured sounding and puncturing patterns.

The puncture pattern may include one or more than one punctures in the channel. The punctures may be related to a subchannel (such as a 20 MHz subchannel of a larger channel) or for partial channels (such as identified resource units, RUs of a channel. RUs refer to subcarriers of a channel and therefore can be used to identify frequencies within a subchannel. A null data packet announcement (NDPA) may indicate RUs (such as a start and end RU index) for a single puncture. In some implementations, the Start and End RU index may be swapped to inform a beamformee that a puncture bandwidth is signaled rather than a full feedback bandwidth. When more than one puncture is present, multiple Start and End RU Indices together may indicate the punctures and that a punctured bandwidth is being signaled.

In some implementations, a management frame (such as a beacon frame) may globally inform the BSS regarding punctured bandwidth. For example, the management frame may indicate the subchannels or RUs that are being punctured. In some implementations, a beamformed transmitter may indicate the start and end RU index of a feedback bandwidth. A beamformee receiver may remove the punctured BW from the feedback bandwidth. If capable of punctured transmissions, the beamformee may transmit beamforming feedback based on the punctured bandwidth. Otherwise, the feedback beamforming feedback may include channel quality regarding a largest contiguous bandwidth in the channel.

In some implementations, the endpoints may support dynamic puncturing. For example, an NDPA may indicate a puncturing pattern using a bitmap. For example an endpoint may solicit partial bandwidth feedback by indicating a puncturing pattern in an NDPA. The punctured sounding may be indicated by the inclusion of a non-zero Disallowed Subchannel Bitmap subfield in the NDPA frame. The disallowed subchannels may be applied to the tone information to be included in the feedback after selecting tones for feedback based on the RU Start Index and RU End Index subfield values and NDPA frame bandwidth.

Particular implementations of the subject matter described in this disclosure can be implemented to realize one or more of the following potential advantages. Sounding and feedback may take into account puncturing. The puncturing may include subchannel puncturing or partial channel puncturing (indicated using RUs associated with an Exclusion BW Zone). Using the techniques of this disclosure endpoints may effectively determine channel quality of a channel that uses puncturing. Furthermore, the techniques support beamformed communication by enabling beamforming endpoints to determine channel quality with respect to punctured channels.

FIG. 1 is a diagram that illustrates a multiple-access multiple-input multiple-output (MIMO) system 100 with access points and user terminals. For simplicity, only one access point 110 is shown in FIG. 1. An access point is generally a fixed station that communicates with the user terminals, and a user terminal or STA may be fixed or mobile, and may be referred to herein as simply a wireless communication device. The access point 110 may communicate with one or more wireless communication device 120 (illustrated as UTs 120*a-i*) at any given moment on the downlink (DL) and uplink (UL). The downlink (i.e., forward link) is the communication link from the access point 110 to the wireless communication devices 120, and the uplink (i.e., reverse link) is the communication link from the wireless communication devices 120 to the access point 110. A wireless communication device 120 may also communicate peer-to-peer with another wireless communication device 120. A system controller 130 couples to and provides coordination and control for the access points 110.

While portions of the following disclosure will describe wireless communication device 120 capable of communicating via Spatial Division Multiple Access (SDMA), for certain aspects, the wireless communication devices 120 may also include some wireless communication devices 120 that do not support SDMA. Thus, for such aspects, the AP 110 may be configured to communicate with both SDMA and non-SDMA user terminals. This approach may conveniently allow older versions of wireless communication devices 120 ("legacy" stations) that do not support SDMA to remain deployed in an enterprise, extending their useful lifetime, while allowing newer SDMA wireless communication devices to be introduced as deemed appropriate.

The system 100 employs multiple transmit and multiple receive antennas for data transmission on the downlink and uplink. The access point 110 is equipped with Nap antennas and represents the multiple-input (MI) for downlink transmissions and the multiple-output (MO) for uplink transmissions. A set of K selected wireless communication devices 120 collectively represents the multiple-output for downlink transmissions and the multiple-input for uplink transmissions. For pure SDMA, it is desired to have Nap≤K≤1 if the data symbol streams for the K wireless communication devices are not multiplexed in code, frequency or time by some means. K may be greater than Nap if the data symbol streams can be multiplexed using TDMA technique, different code channels with CDMA, disjoint sets of sub-bands with OFDM, and so on. Each selected wireless communication device may transmit user-specific data to and/or receive user-specific data from the access point. In general, each selected wireless communication device may be equipped with one or multiple antennas (i.e., Nut≥1). The K selected wireless communication devices can have the same number of antennas, or one or more wireless communication devices may have a different number of antennas.

The system 100 may be a SDMA system according to a time division duplex (TDD) or a frequency division duplex (FDD). For a TDD system, the downlink and uplink share the same frequency band. For an FDD system, the downlink and uplink use different frequency bands. The system 100 may also be a MIMO system utilizing a single carrier or multiple carriers for transmission. Each wireless communication device 120 may be equipped with a single antenna (for example, in order to keep costs down) or multiple antennas (for example, where the additional cost can be supported). The system 100 may also be a TDMA system if the wireless communication devices 120 share the same frequency channel by dividing transmission/reception into different time slots, where each time slot may be assigned to a different wireless communication device 120.

Figure 2:
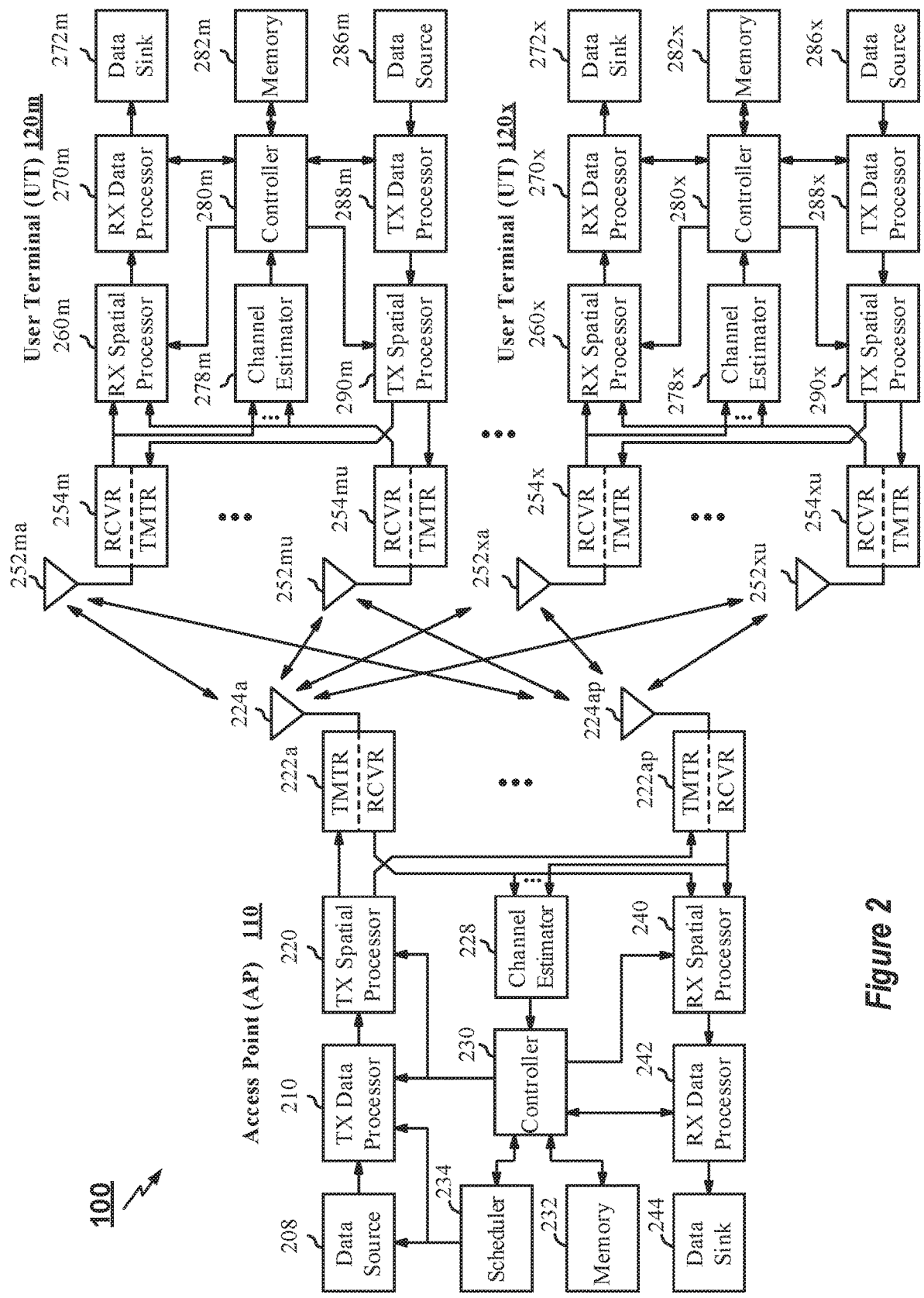
FIG. 2 illustrates a block diagram of the access point and two wireless communication devices in the MIMO system of FIG. 1.

FIG. 2 illustrates a block diagram of the access point 110 and two wireless communication devices (illustrated as user terminal 120*m* and user terminal 120*x*) in system 100 (illustrated as a MIMO system). The access point 110 is equipped with Nt antennas 224*a* and 224*ap*. The user terminal 120*m* is equipped with Nut,m antennas 252*ma* and 252*mu*, and the user terminal 120*x* is equipped with Nut,x antennas 252*xa* and 252*xu*. The access point 110 is a transmitting entity for the downlink and a receiving entity for the uplink. The wireless communication devices 120 are transmitting entities for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, Nup wireless communication devices 120 are selected for simultaneous transmission on the uplink, and Ndn wireless communication devices 120 are selected for simultaneous transmission on the downlink. Nup may or may not be equal to Ndn, and Nup and Ndn may be static values or may change for each scheduling interval. Beam-steering or some other spatial processing technique may be used at the access point 110 and/or the wireless communication devices 120.

On the uplink, at each wireless communication device 120 selected for uplink transmission, a TX data processor 288 receives traffic data from a data source 286 and control data from a controller 280. The TX data processor 288 processes (for example, encodes, interleaves, and modulates) the traffic data for the wireless communication device 120 based on the coding and modulation schemes associated with the rate selected for the wireless communication device 120 and provides a data symbol stream. A TX spatial processor 290 performs spatial processing on the data symbol stream and provides Nut,m transmit symbol streams for the Nut,m antennas. Each transmitter unit (TMTR) 254 receives and processes (for example, converts to analog, amplifies, filters, and frequency upconverts) a respective transmit symbol stream to generate an uplink signal. Nut,m transmitter/receiver units 254 provide Nut,m uplink signals for transmission from Nut,m antennas 252, for example to transmit to the access point 110.

Nup wireless communication devices 120 may be scheduled for simultaneous transmission on the uplink. Each of these wireless communication devices 120 may perform spatial processing on its respective data symbol stream and transmit its respective set of transmit symbol streams on the uplink to the access point 110.

At the access point 110, Nup antennas 224a through 224ap receive the uplink signals from all Nup wireless communication device 120 transmitting on the uplink. Each antenna 224 provides a received signal to a respective receiver unit (RCVR) 222. Each transmitter/receiver unit 222 performs processing complementary to that performed by transmitter/receiver unit 254 and provides a received symbol stream. An RX spatial processor 240 performs receiver spatial processing on the Nup received symbol streams from Nup transmitter/receiver units 222 and provides Nup recovered uplink data symbol streams. The receiver spatial processing may be performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (for example, demodulates, deinterleaves, and decodes) each recovered uplink data symbol stream in accordance with the rate used for that stream to obtain decoded data. The decoded data for each wireless communication device 120 may be provided to a data sink 244 for storage and/or a controller 230 for further processing.

On the downlink, at the access point 110, a TX data processor 210 receives traffic data from a data source 208 for Ndn wireless communication devices 120 scheduled for downlink transmission, control data from a controller 230, and possibly other data from a scheduler 234. The various types of data may be sent on different transport channels. TX data processor 210 processes (for example, encodes, interleaves, and modulates) the traffic data for each wireless communication device 120 based on the rate selected for that wireless communication device 120. The TX data processor 210 provides Ndn downlink data symbol streams for the Ndn wireless communication devices 120. A TX spatial processor 220 performs spatial processing (such as a precoding or beamforming) on the Ndn downlink data symbol streams, and provides Nup transmit symbol streams for the Nup antennas. Each transmitter/receiver unit 222 receives and processes a respective transmit symbol stream to generate a downlink signal. Nup transmitter/receiver units 222 may provide Nup downlink signals for transmission from Nup antennas 224, for example to transmit to the wireless communication devices 120.

At each wireless communication device 120, Nut,m antennas 252 receive the Nup downlink signals from the access point 110. Each transmitter/receiver unit 254 processes a received signal from an associated antenna 252 and provides a received symbol stream. An RX spatial processor 260 performs receiver spatial processing on Nut,m received symbol streams from Nut,m transmitter/receiver units 254 and provides a recovered downlink data symbol stream for the wireless communication device 120. The receiver spatial processing may be performed in accordance with the CCMI, MMSE, or some other technique. An RX data processor 270 processes (for example, demodulates, deinterleaves and decodes) the recovered downlink data symbol stream to obtain decoded data for the wireless communication device 120.

At each wireless communication device 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the wireless communication device 120 based on the downlink channel response matrix Hdn,m for that wireless communication device 120. Controller 230 derives the spatial filter matrix for the access point 110 based on the effective uplink channel response matrix Hup,eff. The controller 280 for each wireless communication device 120 may send feedback information (for example, the downlink and/or uplink eigenvectors, eigenvalues, SNR estimates, and so on) to the access point 110. The controllers 230 and 280 may also control the operation of various processing units at the access point 110 and wireless communication devices 120, respectively.

Figure 3:
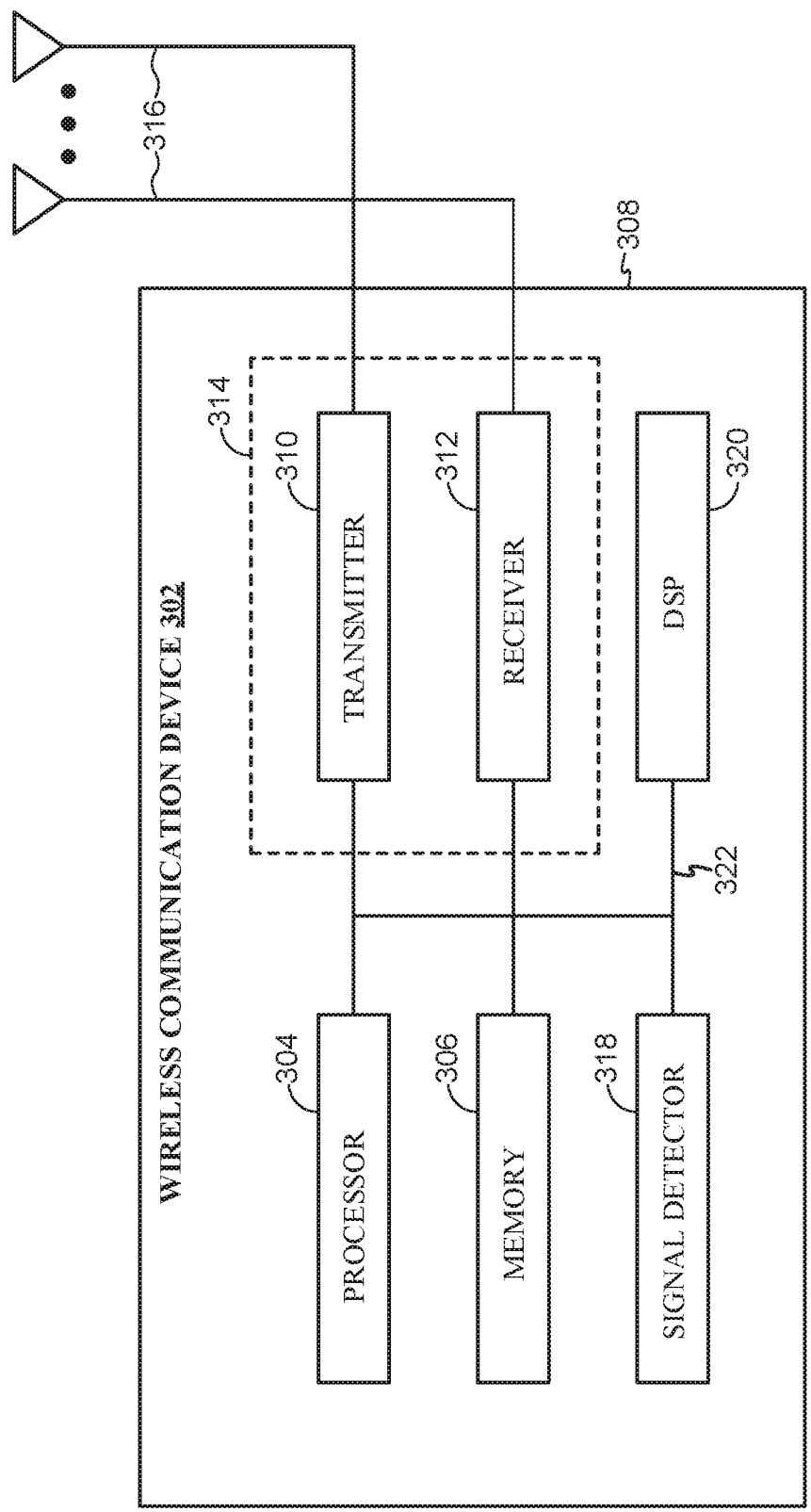
FIG. 3 illustrates various components that may be utilized in a wireless device that may be employed within a wireless communication system.

FIG. 3 illustrates various components that may be utilized in a wireless communication device 302 that may be employed within the wireless communication system 100. The wireless communication device 302 is an example of a device that may be configured to implement the various methods described herein. The wireless communication device 302 may implement an access point 110 or a wireless communication device 120.

The wireless communication device 302 may include a processor 304 which controls operation of the wireless communication device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 may perform logical and arithmetic operations based on program instructions stored within the memory 306. The instructions in the memory 306 may be executable to implement the methods described herein.

The processor 304 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (for example, in source code format, binary code format, executable code format, or any other suitable format of code). The instructions, when executed by the one or more processors, cause the processing system to perform the various functions described herein.

The wireless communication device 302 may also include a housing 308 that may include a transmitter 310 and a receiver 312 to allow transmission and reception of data between the wireless communication device 302 and a remote location. The transmitter 310 and receiver 312 may be combined into a transceiver 314. A single or a plurality of transceiver antennas 316 may be attached to the housing 308 and electrically coupled to the transceiver 314. The wireless communication device 302 may also include (not shown) multiple transmitters, multiple receivers, and multiple transceivers.

The wireless communication device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless communication device 302 may also include a digital signal processor (DSP) 320 for use in processing signals.

The various components of the wireless communication device 302 may be coupled together by a bus system 322, which may include a power bus, a control signal bus, and a status signal bus in addition to a data bus.

Certain aspects of the present disclosure support transmitting uplink (UL) channel state information (CSI) from multiple STAs to an AP. In some embodiments, the UL CSI may be transmitted in a multi-user MIMO (MU-MIMO) system. Alternatively, the UL CSI may be transmitted in a multi-user FDMA (MU-FDMA), multi-user OFDMA (MU-OFDMA) or similar FDMA system.

The sounding procedure described herein may comprise at least an "announcement frame" (or "null data packet announcement (NDPA) frame") and a "CSI frame," and may additionally or alternatively comprise a "null data packet (NDP) frame," a "trigger frame" (or "clear to transmit (CTX) frame"), and a "report poll frame." In the context of 802.11 specifications, the "frame" may be identified as a physical layer convergence protocol data unit (PPDU), a medium access control protocol data unit (MPDU), or some portion thereof (for example, a header or preamble of a PPDU or MPDU). The announcement frame(s) may convey at least sounding announcement information which instructs the STAs on whether/how to compute the CSI, and UL-SU or UL-MU resource allocation information which instructs the STAs on how to send the CSI by using UL-MU-MIMO or UL-OFDMA.

The sounding announcement may comprise a PPDU carrying sounding announcement information in the medium access control (MAC) payload or in its physical layer (PHY) header. The sounding announcement information may comprise identifiers of the STAs that are to report the CSI, and may comprise additional parameters of information useable for the computation and transmissions of the CSI. The header of the PPDU carrying the sounding announcement information (or a sounding NDP in some embodiments) may provide a reference signal that allows STAs to estimate the channel between the one or more antennas of the transmitter and the one or more antennas of the STA. The header may be and may be an 802.11ax header frame, an 802.11ac header frame, an 802.11n header frame, an 802.11ah header frame, or other 802.11 based header frame. In some aspects, the header may comprise a plurality of long-training fields (LTFs), and may be referred to herein as a "staggered sounding" procedure.

In some embodiments, CSI may comprise known channel properties of a communication link. In some aspects the CSI may describe how a signal propagates and represents the combined effect of, for example, scattering, fading, and power decay with distance. For example, for MU-MIMO transmissions, the CSI may comprise one or more of a beamforming matrix, received signal strength, and other information that allows weighting of antennas to mitigate interference in the spatial domain.

Figure 4:
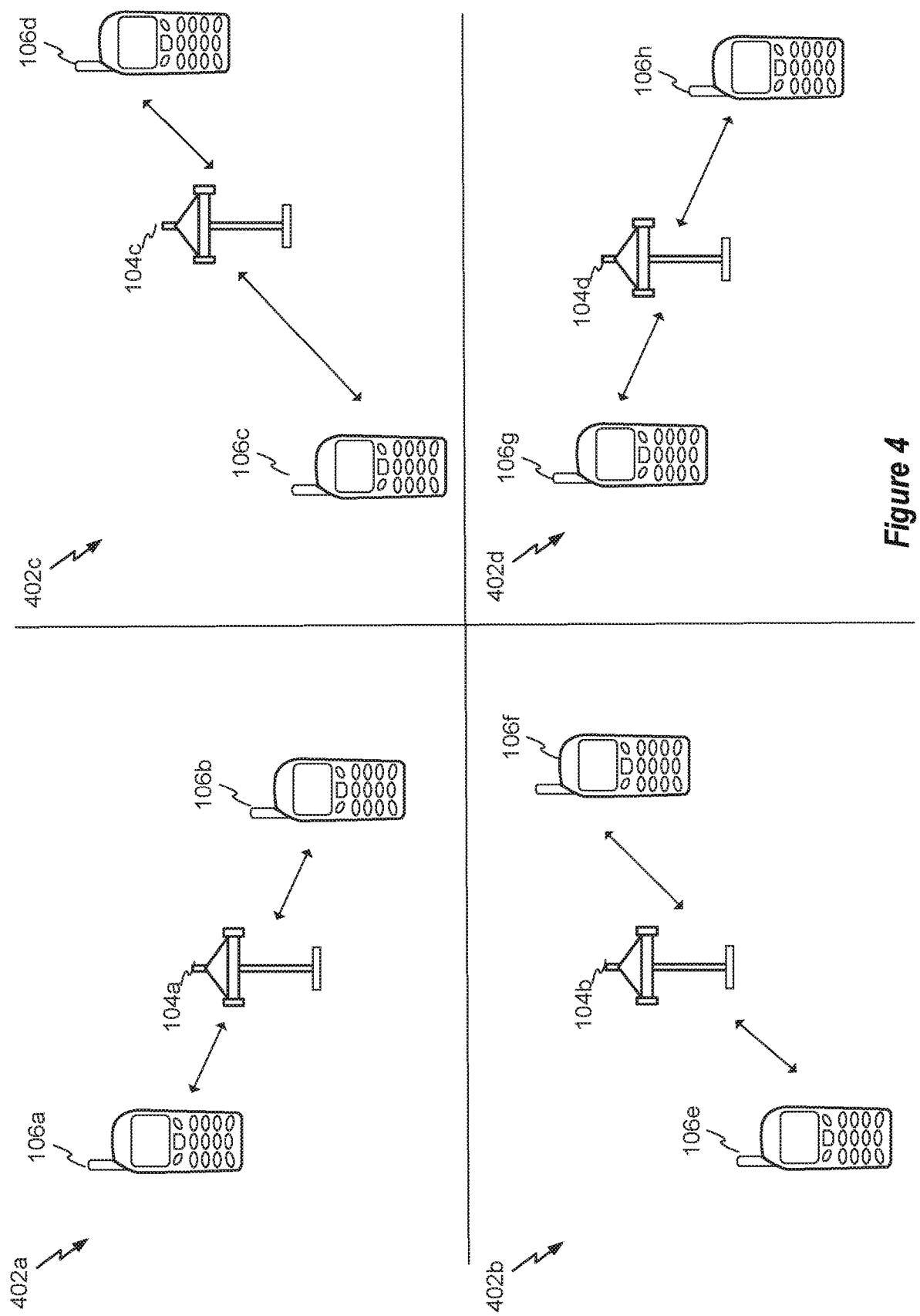
FIG. 4 schematically illustrates an example configuration of a distributed MIMO wireless communication system in accordance with certain embodiments described herein.

FIG. 4 shows four basic service sets (BSSs) 402a-d, each BSS including an access point 104a-d respectively. Each access point 104a-d is associated with at least two stations within its respective BSS 402a-d. AP 104a is associated with STA 106a-b. AP 104b is associated with STA 106c-d. AP 104c is associated with STA 106e-f. AP 104d is associated with STAs 106g-h. An AP 104 that is associated with a STA 106 may be referred to as a BSS AP for the STA throughout this disclosure. Similarly, an AP 104 for which there is no association with a particular STA 106 may be referred to as an OBSS AP for the STA throughout this disclosure. Associations between an AP 104 and one or more STAs 106 provides for, in part, coordination of communication between devices within the basic service set (BSS) defined by the AP 104 and its associated STAs 106. For example, devices within each BSS may exchange signals with each other. The signals may function to coordinate transmissions from the respective AP 104a-d and stations within the AP's BSS 402a-d.

The devices shown in FIG. 4, including the AP's 104a-d and STA 106a-h, also share a wireless medium. Sharing of the wireless medium is facilitated, in some aspects, via the use of carrier sense media access with collision detection (CSMA/CD). The disclosed embodiments may provide for a modified version of CSMA/CD that provides for an increase in an ability for the BSSs 402a-d to communicate simultaneously when compared to known systems.

The stations 106a-h within the BSSs 402a-d may have different abilities to receive transmissions from their associated AP based, at least in part, on their position relative to the other APs 104 and/or STAs 106 outside their respective BSS (OBSS). For example, because the stations 106a, 106d, 106e, and 106h are positioned relatively far from OBSS APs, these stations may have an ability to receive transmissions from their respective BSS AP even with an OBSS AP or STA is transmitting. Stations having such receive characteristics may be referred to as reuse STAs throughout this disclosure. Reuse STAs may have sufficient signal to noise ratios (SINRs) with OBSS APs that they may communicate with other STAs and/or APs without having to be nulled.

In contrast, STAs 106*b*, 106*c*, 106*f*, and 106*g* are illustrated in positions that are relatively close to an OBSS AP. Thus, these stations may have less ability to receive transmissions from their BSS AP during transmissions from OBSS AP's and/or OBSS STAs due to interference. Stations having such receive characteristics may be referred to as non-reuse or edge STAs throughout this disclosure. Non-reuse STAs may have insufficient signal to noise ratios (SINRs) with OBSS APs requiring that they be nulled in order to communicate with other STAs and/or APs while communications are occurring involving the OBSS APs.

In at least some of the disclosed aspects, two or more of the APs 104*a*-*d* may negotiate to form a cluster of access points. In other aspects, cluster configurations may be defined via manual configuration. For example, each AP 104 may maintain configuration parameters indicating whether the AP 104 is part of one or more cluster, and if so, a cluster identifier for the cluster. In some aspects, the configuration may also indicate whether the AP 104 is a cluster controller 406 for the cluster 404. In some of the embodiments disclosed herein, the cluster controller 406 may take on functions that differ from APs 104 that are part of the cluster 404 but are not the cluster controller 406. Thus, in some aspects, two or more of APs 104*a*-*d* may be included in the same cluster 404. STAs 106 associated with those APs 104 may also be considered to be included in or part of the cluster 404 of their associated AP 104. Therefore, in some aspects the STAs 106*a*-*h* illustrated above may be part of the same cluster 404.

The cluster 404 of APs 104 may coordinate transmissions between themselves and their associated APs 104. In some aspects, the cluster 404 may be identified via a cluster identifier value or number that uniquely identifies the group of APs 104 comprising the cluster 404. In some aspects, during association of a STA 106 with any of the APs 104 in the cluster 404, the cluster identifier value is transmitted to the STA 106 during association, for example, in an association response message. The STA 106 may then utilize the cluster identifier value to coordinate communications within the cluster 404. For example, one or more messages transmitted over the wireless network may include the cluster identifier value, which a receiving STA 106 may use to determine whether the message is addressed to it or not.

In some embodiments, the cluster 404 APs 104 may also utilize various methods to identify STAs 106 within the cluster 404. For example, as known methods of generating association identifiers (AIDs) may not provide uniqueness across APs 104, in some aspects, media access control (MAC) addresses may be utilized to identify STAs 106 where appropriate. For example, known messages including user info fields that utilize association identifiers to identify STAs 106 may be modified to contain data derived from station MAC addresses in the disclosed embodiments. Alternatively, methods of generating association identifiers may be modified to ensure uniqueness within a cluster 404 of APs 104. For example, a portion of the association identifier may uniquely identify an AP 104 within the cluster 404. Stations associated with that access point would be assigned association identifiers including the unique identification. This provides unique association identifiers across access points within a cluster. In some other aspects, an association identifier within a cluster may include the cluster identifier. This may provide for uniqueness across clusters to facilitate future cross-cluster coordination of communication.

Figure 5:
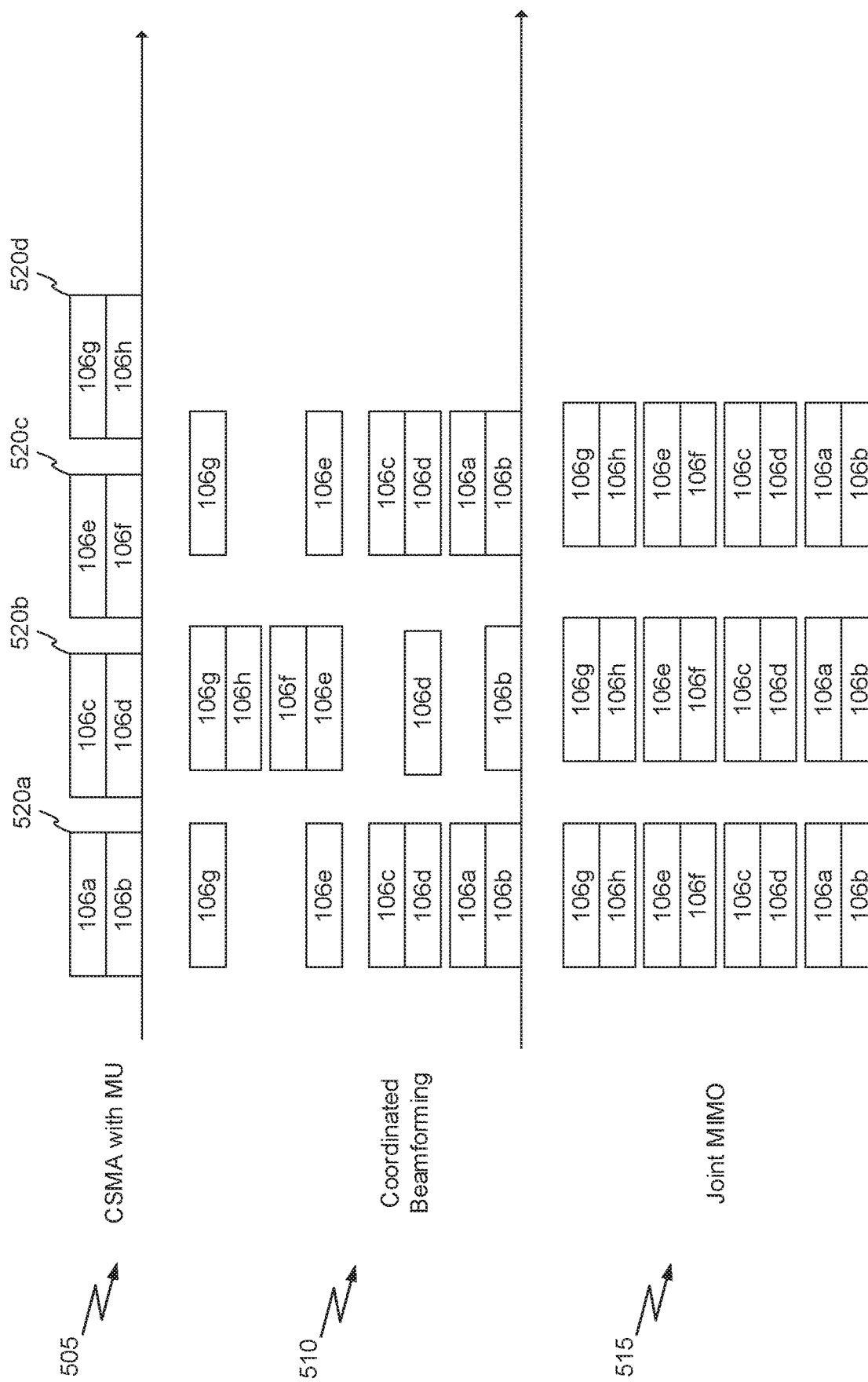
FIG. 5 schematically illustrates example communication options compatible with a distributed MIMO wireless communication system in accordance with certain embodiments described herein.

FIG. 5 shows three exemplary approaches to arbitrating the wireless medium with the communications system 400 of FIG. 4. Approach 505 utilizes carrier sense media access (CSMA) to perform single BSS multi-user transmissions. For example, each of transmissions 520*a*-*d* may be performed by the BSSs 402*a*-*d* of FIG. 4 respectively. The use of traditional CSMA in approach 505 causes the medium to be utilized by only one BSS at any point in time.

Approach 510 utilizes coordinated beamforming (COBF). With the coordinated beamforming approach 510, the APs 104*a*-*d* may coordinate transmissions between their respective BSSs. In some aspects, this coordination may be performed over the wireless medium, or in some aspects, over a back-haul network. In these aspects, the coordination traffic over the backhaul network provided for improved utilization of the wireless medium.

With this approach, reuse STAs for different BSSs may be scheduled to transmit or receive data concurrently. For example, a relative strength of a communication channel between STA 106*a* and AP 104*a* may allow these two devices to exchange data simultaneously with communication with OBSS devices, such as, for example, AP 104*b* and STA 106*d*. In addition, approach 510 allows for non-reuse STAs to be scheduled for transmission concurrently with OBSS devices. For example, STA 106*b*, which is within BSS 402*a*, may be scheduled to communicate simultaneous with communication between AP 104*d* and STA 106*h* of BSS 402*d*. Such simultaneous communication between a non-reuse STA (such as STA 106*b*) and, for example, AP 104*d* may be facilitated by scheduling AP 104*d* to transmit a signal to STA 106*b* simultaneous with AP 104*d*'s transmission to STA 106*h*. For example, AP 104*d* may transmit a null signal for dominant interfering signals to STA 106*b*. Thus, while transmitting a first signal to STA 106*h*, AP 104*d* may simultaneously transmit a signal nulling the first signal to STA 106*b*. Such simultaneous transmission by the AP 104*d* may be provided by selecting individual antenna(s) of a plurality of antennas provided by AP 104*d* for each of the transmissions. Such nulling may create reuse opportunities for otherwise non-reuse STAs. COBF may operate in both DL and UL directions with the APs 104 nulling respective frequencies.

Approach 515 shows an exemplary joint multi-user communication or a distributed MIMO communication across access points 104*a*-*d* within the BSSs 402*a*-*d*. With this joint MIMO approach 515, a cluster of APs (such as APs 104*a*-*d*) may service N 1-SS STAs simultaneously, where N is ~¾ of a total number of antennas across all APs within the cluster. Distributed MIMO communications may coordinate a collection of antennas across the multiple APs within a cluster to transmit to stations within the cluster. Thus, while traditional MIMO methods allocate transmit antennas within a single BSS to stations within the BSS, distributed MIMO provides for allocation of transmit antennas outside a BSS to facilitate communications with stations within the BSS.

In a distributed MIMO communication, a station in one BSS may communicate with one or more access points in another, different BSS. Thus, for example, station 106*a* of BSS 402*a* of FIG. 4 may communicate with access point 104*d*, which is in BSS 402*d*. This communication may occur simultaneously with communication between STA 106*a* and AP 104*a*, the BSS AP of the STA 106*a*. In some aspects of an uplink distributed MIMO communication, the STA 106*a* may conduct one or more uplink communications to AP 104*a* simultaneously with AP 104*d*. Alternatively, a downlink distributed MIMO communication may include AP 104*a* transmitting data to STA 106*a* simultaneously with a transmission from AP 104*d* to STA 106*a*.

Thus, one or more of the distributed embodiments may utilize MIMO in the form of Cooperative Multipoint (CoMP, also referred to as for example Network MIMO (N-MIMO), Distributed MIMO (D-MIMO), or Cooperative MIMO (Co-MIMO), etc) transmission, in which multiple access points maintaining multiple corresponding basic service sets, can conduct respective cooperative or joint communications with one or more STAs 106. CoMP communication between STAs and APs can utilize for example, a joint processing scheme, in which an access point associated with a station (a BSS AP) and an access point that is not associated with a station (a OBSS AP) cooperate to engage in transmitting downlink data to the STA and/or jointly receiving uplink data from the STA. Additionally or alternatively, CoMP communication between an STA and multiple access points can utilize coordinated beamforming, in which a BSS AP and an OBSS AP can cooperate such that an OBSS AP forms a spatial beam for transmission away from the BSS AP and, in some aspects, at least a portion of its associated stations, thereby enabling the BSS AP to communicate with one or more of its associated stations with reduced interference.

To facilitate the coordinated beamforming approach 510 or the joint MIMO approach 515, an understanding of channel conditions between an access point and OBSS devices may provide for greater wireless communication efficiency.

Figure 6:
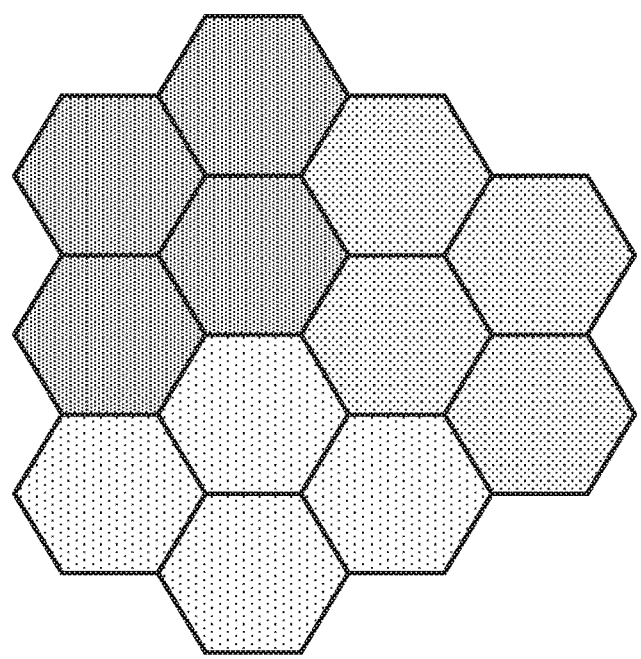
FIG. 6 schematically illustrates a plurality of basic service sets (BSSs) of an exemplary distributed MIMO wireless communication system.

FIG. 6 schematically illustrates a plurality of basic service sets (BSSs) 600 of an exemplary distributed MIMO wireless communication system. Each hexagon of FIG. 6 represents an access point and associated stations, collectively referred to as a basic service set (BSS). The individual BSSs are grouped into clusters in accordance with certain embodiments described herein. In the example schematically illustrated by FIG. 6, a first cluster (C1) comprises four BSSs, a second cluster (C2) comprises four BSSs, and a third cluster (C3) comprises four BSSs. In certain other embodiments, a cluster can comprise 2, 3, 4, 5, or any numbers of BSSs and a wireless communication system can comprise one or more clusters (for example, 2, 3, 4, 5 or other numbers of clusters).

In certain embodiments, to perform distributed MIMO communications, devices within two or more BSSs of a cluster may transmit over a single channel simultaneously (for example, transmit data from a plurality of access points of the BSS simultaneously via the single channel, or transmit data from a plurality of stations in different BSSs simultaneously to a single AP). In some aspects, a centralized scheduler (not shown) may coordinate transmissions across the clusters C1-C3. For example, coordination may include selecting which devices will transmit simultaneously from multiple BSSs to perform a joint MIMO communication.

Figure 7A:
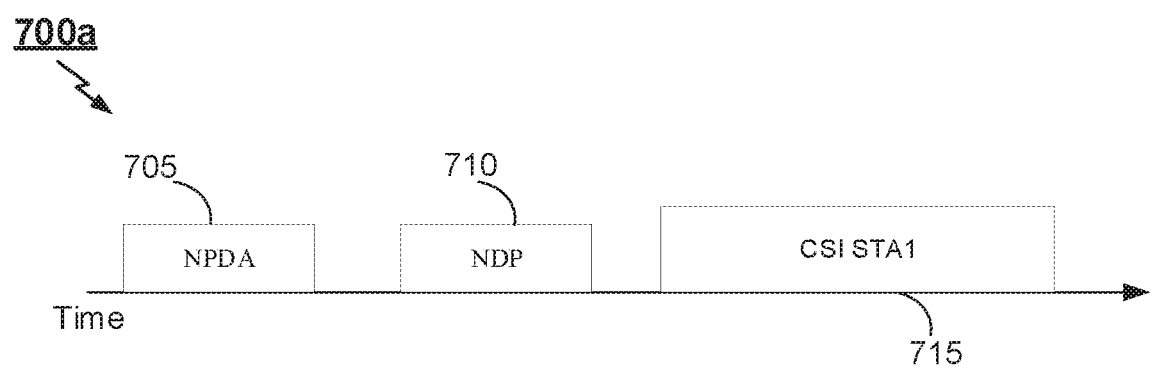
FIG. 7A shows a time diagram of an example frame exchange of channel state information (CSI) feedback.

FIG. 7A is a time sequence diagram illustrating an example of a frame exchange 700*a* of channel state information (CSI) feedback between an AP 110 and a wireless communication device 120 (for example, wireless communication device 120*a* of FIG. 1, illustrated as STA1 in FIG. 7A) in a single user (SU) environment. The frame exchange 700*a* includes a transmission of a high efficiencies NDPA frame 705 from the AP 110 to the wireless communication device 120, a transmission of an NDP frame 710 from the AP 110 to the wireless communication device 120, and the CSI feedback 715 from the wireless communication device 120 to the AP 110.

The HE NDPA 705 may comprise various fields, as discussed in more detail herein. The HE NDPA 705 may identify recipients of the NDPA 705, and may further identify corresponding parameters for transmission of CSI (for example, for the CSI transmission 715). For instance, in one embodiment, the HE NDPA 705 may instruct the wireless communication device 120 to use legacy (for example, 802.11ac), UL-MU-MIMO, UL-OFDMA, or a combination thereof in their transmission of the requested CSI. In an exemplary embodiment, the HE NDPA 705 is a PPDU. In accordance with this embodiment, HE NDPA 705 may be considered the PPDU. In some aspects, the HE NDPA 705 may be contained in the payload or MAC frame of the PPDU. In some embodiments, the HE NDPA 705 may instruct the recipient wireless communication device 120 to respond simultaneously after the HE NDPA 705. In various aspects, the wireless communication device 120 may be instructed to respond a short interframe space (SIFS) time period after receiving the HE NDPA 705. The HE NDPA 705 may be transmitted in accordance with a format similar to the frame 800 discussed herein with respect to FIG. 8.

In one embodiment, the HE NDPA 705 may be the only frame contained in the payload of the transmitted frame. In other embodiments, the payload of the transmitted frame may comprise additional fields in the payload. In accordance with this embodiment, the recipient wireless communication device 120 may be the only device sounded and the only device from which CSI is requested.

In some embodiments, the HE NDPA 705 indicates that an NDP is forthcoming (NDP 710, as shown in FIG. 7A), that the wireless communication device 120 is the intended recipient of the forthcoming NDP 710, and the format thereof. In some embodiments, the HE NDPA 705 may not indicate the presence of the forthcoming NDP 710, and the NDP 710 may indicate itself that it is the NDP 710. In other embodiments, neither the HE NDPA 705 nor the NDP 710 indicates that the NDP 710 is a sounding NDP, and the wireless communication device 120 may instead determine on its own that the NDP 710 is a sounding NDP. In an exemplary embodiment, HE NDPA 705 is an NDPA contained in a PPDU. In some aspects, the NDP 710 is an HE NDP or a VHT NDP. This may be indicated by one or more bits in the HE NDPA 705. In one embodiment, a reserved bit in the HE NDPA 705 (for example, a dialog token field) is used to indicate that the NDP 710 is an HE NDP, or that the NDP 710 is a VHT NDP. In another embodiment, the AP 110 designates a specific value of the dialog token field to indicate HE sounding or VHT sounding. In accordance with any of these embodiments, the wireless communication devices 120 receiving the NDP 710 know whether to respond with CSI using HE sounding or VHT sounding.

In some embodiments, the HE NDPA 705 may also instruct the recipient wireless communication device 120 to respond simultaneously after the NDP 710. In various aspects, the wireless communication device 120 may be instructed to respond a short interframe space (SIFS) time period after receiving the NDP 710. The HE NDPA 705 may further instruct the wireless communication device 120 to use legacy (for example, 802.11ac), UL-MU-MIMO, UL-OFDMA, or a combination thereof, and the corresponding parameters for transmission of CSI (for example, for CSI transmission 410A). The HE NDPA 705 may be transmitted in accordance with a format similar to frame 800 discussed herein with respect to FIG. 8.

The AP 110 may transmit the NDP 710 following the HE NDPA 705. In response to the NDP 710, the wireless communication device 120 may transmit CSI to the AP 110. Specifically, the wireless communication device 120 identified by the HE NDPA 705 may estimate the channel based on the NDP 710 and send a representation of the estimated channel in a sounding feedback CSI transmission. In FIG. 7A, STA1 transmits CSI transmission 715 to the AP 110. The CSI transmission 715 may be a legacy transmission, UL-MU-MIMO transmission, UL-OFDMA transmission, or some combination thereof. Upon receiving the CSI transmission 715, the AP 110 may accurately determine information about the channel from the AP 110 to the wireless communication device 120 (for example, STA1). In various aspects, the time in between the HE NDPA 705 and the NDP 710 may be a SIFS time period and the timing in between the NDP 710 and the CSI transmission 715 may be a SIFS (or point interframe space (PIFS)) time period. In other aspects, single user or multi-user beamforming report (SU BR or MU BR) polls may be used to request CSI from the wireless communication devices 120. Minor alterations may be made to frame exchange 700*a* in order to enable a multi-user frame exchange, as discussed herein.

Figure 7B:
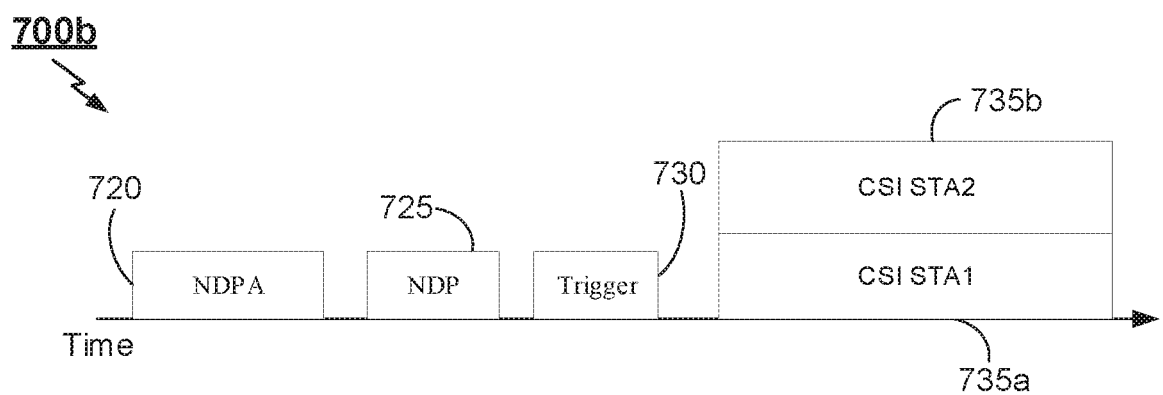
FIG. 7B shows a time diagram of an example frame exchange of channel state information (CSI) feedback.

FIG. 7B shows a time diagram of an example frame exchange 700*b* of channel state information (CSI) feedback. The frame exchange 700*b* includes a transmission of an HE NDPA frame 720 from the AP 110 to the wireless communication device 120, a transmission of an NDP frame 725 from the AP 110 to the wireless communication device 120, a trigger frame 730 from the AP 110 to the wireless communication device 12, and the CSI feedback 735*a* and 735*b* from the wireless communication devices 120*a* and 120*b* to the AP 110. The frame exchange 700*b* CSI feedback may occur between an AP 110 and at least two wireless communication devices 120 (for example, wireless communication devices 120*a* and 120*b* of FIG. 1, illustrated as STA1 and STA2 in FIG. 7B) in a multi-user (MU) environment.

As shown in FIG. 7B, and in conjunction with FIG. 1, an AP 110 may transmit a high efficiency (HE) NDPA frame 720 to the wireless communication devices 120. The HE NDPA 720 may comprise various fields, as described in more detail herein. The HE NDPA 720 may be similar to the HE NDPA 705 described herein.

Unlike the HE NPDA 705, the HE NDPA 720 may be followed by a trigger frame 730. In various aspects, the trigger frame 730 may indicate which wireless communication devices 120 are to participate in the frame exchange 700*b*, such that a particular wireless communication device 120 knows to start a transmission (for example, transmission 735*a* or 735*b*). In some aspects, the trigger frame 730 may provide an indication of a resource allocation to the wireless communication devices 120 for the transmission of the CSI requested by the AP 110, or for other uplink transmissions. In some embodiments, the indication of the resource allocation is an indication of a spatial stream or frequency bandwidth allocated to the wireless communication device 120, which may be a specific tone or sub-band allocation. The HE NDPA 720 may be aggregated with the trigger frame 730. For example, the trigger frame 730 may be transmitted within a payload of the HE NDPA 720. In another example, the trigger frame 730 is sent after the HE NDPA 720 without any time between the transmissions.

The AP 110 may then transmit the NDP 725 following the HE NDPA 720. In response to the NDP 725, the wireless communication devices 120 may generally transmit CSI to the AP 110. Specifically, the wireless communication devices 120 identified by the HE NDPA 720 may estimate the channel based on the NDP 725 and send a representation of the estimated channel in a sounding feedback CSI transmission 735. In FIG. 7B, STA1 and STA2 concurrently transmit CSI transmissions 735*a* and 735*b* to the AP 110. The CSI transmissions 735*a* and 735*b* may be UL-MU-MIMO transmissions, UL-OFDMA transmissions, or some combination thereof. In some embodiments, the concurrent transmissions may occur at the same time or within a certain threshold time period. These concurrent transmissions may utilize the resource allocation provided in the trigger frame 730. Upon receiving the CSI transmissions 735*a* and 735*b*, the AP 110 may accurately determine information about the channel from the AP 110 to each of the wireless communication devices 120 (for example, STA1 and STA2). The NDP 725 may be transmitted in accordance with an NDP format. In one embodiment, NDP 725 may comprise a bit or bits indicating that a MU CSI response is requested from the wireless communications devices 120. In some aspects, NDP 725 may be an HE NDP. In various aspects, the time in between the HE NDPA 720 and the NDP 725 may be a SIFS time period and the timing in between the NDP 725 and the CSI transmissions 735*a* and 735*b* may be a SIFS (or PIFS) time period.

In some aspects, the AP 110 may utilize the HE NDPA 720 in order to request CSI for a tone or sub-band of the spatial stream or frequency bandwidth from each wireless communication device 120. For example, the HE NDPA 720 or NDP 725 may contain an indication of a sub-band for which CSI is requested, per each wireless communication device 120. In one embodiment, the spatial stream or bandwidth allocated to each wireless communication device 120 in the trigger frame 730 may indicate that CSI is requested from the wireless communication device 120 for that spatial stream or bandwidth. Accordingly, the wireless communication devices 120 may respond with the requested CSI for the spatial stream or bandwidth in transmissions 735*a* and 735*b*.

In some aspects, the HE NDPA 720 and trigger frame 730 are sent on 20/40/80/160 MHz even though the wireless communication device 120 is only requested to report a portion of the bandwidth. In other aspects, the HE NDPA 720 may be sent to each of the wireless communication devices 120 on a sub-band per each wireless communication device 120 or group of wireless communication devices 120 that are allocated to that sub-band. The HE NDPA 720 may be contained in a MAC frame of the PPDU (for example, packet 402), or may contain an indication in the header of the PPDU. Each wireless communication device 120 may compute the CSI for the sub-band on which the HE NDPA 720 was received. In accordance with this embodiment, the NDP 725 may be sent on 20/40/80/160 MHz. Thereafter, the wireless communication devices 120 may reply with the CSI in transmissions 735*a* and 735*b*. In one embodiment, the downlink bandwidth and uplink bandwidth may be the same. The above described embodiments may also be combined. For example, a different HE NDPA 720 may be sent on each 20 mHz sub-band, and may also indicate a sub-band for the CSI, per each wireless communication device 120.

Figure 8:
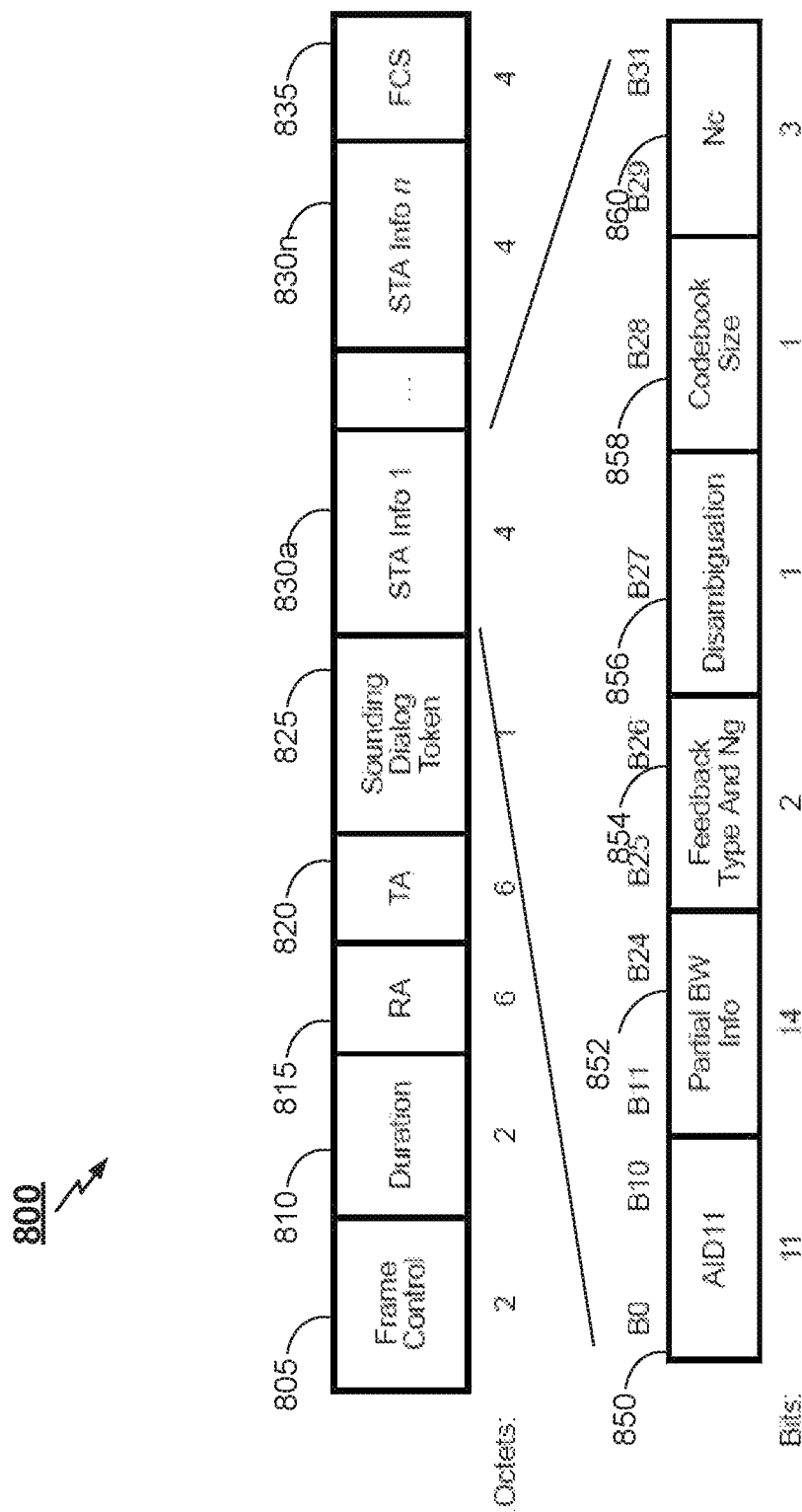
FIG. 8 shows a diagram of one embodiment of a null data packet announcement (NDPA) frame.

FIG. 8 shows a diagram of one embodiment of MAC null data packet announcement (NDPA) frame 800. In this embodiment, the NDPA frame 800 includes a frame control (FC) field 805 having a length of 2 octets, a duration field 810 having a length of 2 octets, a receiver address (RA) field 815 having a length of 6 bytes, a transmitter address (TA) field 820 having a length of 6 bytes, a sounding dialog token field 825 having a length of 1 byte, a number n of STA information (info) fields 830 each having a length of 4 bytes, and a frame check sequence (FCS) field 835 having a length of 4 bytes.

The FC field 805 may indicate a control subtype or an extension subtype. In the FC field 805, the protocol version, type, and subtype may be the same as defined for the NDP announcement frame defined by the 802.11ac standard. In this case, one or more bits in one of the FC field 805, duration field 810, TA field 820, RA field 815, or sounding dialog token field 825 may be used to indicate that the NDPA frame 800 has a modified format for its use as described in this application. Alternatively, a specific type and subtype may be used to indicate that the NDPA frame 800 has a specific format for the use as described in this application. In some aspects, two reserved bits in the sounding dialog token field 825 may be used to indicate whether the wireless communication devices 120 should send their responses to the NDPA frame 800 via UL-MU-MIMO transmissions, UL-OFDMA transmissions, or according to 802.11ac behavior (such as, one STA sends CSI immediately and the other STAs wait to be polled).

The duration field 810 indicates to any receiver of the NDPA frame 800 to set the network allocation vector (NAV). The RA field 815 indicates the wireless communication devices 120 (or STAs) that are the intended recipients of the frame. The RA field 815 may be set to broadcast or to a multicast group that includes the STAs listed in the STA info fields 830-840. If the type or subtype are set to a particular value, the RA field 815 may be omitted, as the type/subtype implicitly indicates that the destination is broadcast. The TA field 820 indicates the transmitter address or a BSSID. The sounding dialog token field 825 indicates the particular sounding announcement to the STAs. Additionally, a field indicating the sub-channel or bandwidth for which the CSI is requested may be added.

In an embodiment where the NDPA frame 800 indicates response should be sent using UL-MU-MIMO, the wireless communication devices 120 listed in the STA info fields 830-830*n* may respond by using UL-MU-MIMO. In this aspect, the stream ordering may follow the same ordering of STA info fields 830-830*n*. Additionally, the number of streams to be allocated and the power offsets for each of the wireless communication devices 120 may be pre-negotiated. In another aspect, the number of streams allocated per wireless communication device 120 may be based on the number of streams sounded by the sounding NDP. For example, the number of streams per wireless communication device 120 may be equal to the number of sounded streams divided by the maximum number of streams available for all wireless communication devices 120 listed.

In an embodiment where the NDPA frame 800 indicates response should be sent using UL-OFDMA, the wireless communication devices 120 listed in the STA info fields 830*a*-830*n* may respond by using UL-OFDMA. In this aspect, the channel ordering may follow the same ordering of STA info fields 830*a*-830*n*. Additionally, the number of channels to be allocated and the power offsets for each of the wireless communication devices 120 may be pre-negotiated. In another aspect, the number of channels allocated per wireless communication device 120 may be based on the number of channels sounded by the NDP 710 or 725.

The STA info field 830 contains information regarding a particular wireless communication device 120 and may include a per wireless communication device 120 set of information (see STA info 1 830*a* and STA info N 830*n*). The STA info field 830 may include an allocation identifier (AID) field 850 which identifies a STA, a partial bandwidth information (info) field 852, a feedback type and Ng field 854, a disambiguation field 856, a codebook size field 858, and a Nc index field 860. The FCS field 850 carries an FCS value used for error detection of the NDPA frame 800. In some aspects, the NDPA frame 800 may also include a PPDU duration field (not shown). The PPDU duration field indicates the duration of the following UL-MU-MIMO (or UL-OFDMA) PPDU that the wireless communication devices 120 are allowed to send. In other aspects, the PPDU duration may be agreed to beforehand between an AP 110 and the wireless communication devices 120. In some embodiments, the PPDU duration field may not be included if the duration field 810 is used to compute the duration of the response that the wireless communication devices 120 are allowed to send.

In some aspects, the NDPA frame 800 may also include a PPDU duration field (not shown). The PPDU duration field indicates the duration of the following UL-MU-MIMO PPDU that the wireless communication devices 120 are allowed to send. In other aspects, the PPDU duration may be agreed to beforehand between an AP 110 and the wireless communication devices 120. In some embodiments, the PPDU duration field may not be included if the duration field 810 carries a value that allows computation of the duration of the response that the wireless communication devices 120 are allowed to send.

The sounding procedures described above may correspond to channels and bandwidths that are not impeded or restricted by exclusion zones. For example, the sounding procedures described above may utilize the full 80 MHz channel widths and the subsequent and corresponding CSI feedback also utilizes the full 80 MHz channel bandwidth. However, in some systems and networks, one or more portions of the 80 MHz bandwidth may not be available for sounding by the AP 110 and the wireless communication device(s) 120. For example, in some systems and networks, certain channels of the 80 MHz bandwidth may be occupied by neighboring BSSs or by incumbent technologies. These "occupied" channels of the 80 MHz bandwidth may be referred to herein as exclusion BW zones. Accordingly, the AP 110 may be configured to avoid sounding over these exclusion BW zones. Additionally, the AP 110 may be configured to indicate to the wireless communication device 120 that the exclusion BW zone(s) exists and how to avoid sounding over the exclusion BW zone(s). In some embodiments, the exclusion BW zone(s) may not align with identified 20 MHz channel boundaries and may not have a width that is a multiple of 20 MHz. Accordingly, methods and apparatus for puncturing the NDPA and NDP transmissions as well as signaling such puncturing are described below. Additionally, methods and apparatus for puncturing the CSI feedback as well as signaling such puncturing are described below.

Figure 9A:
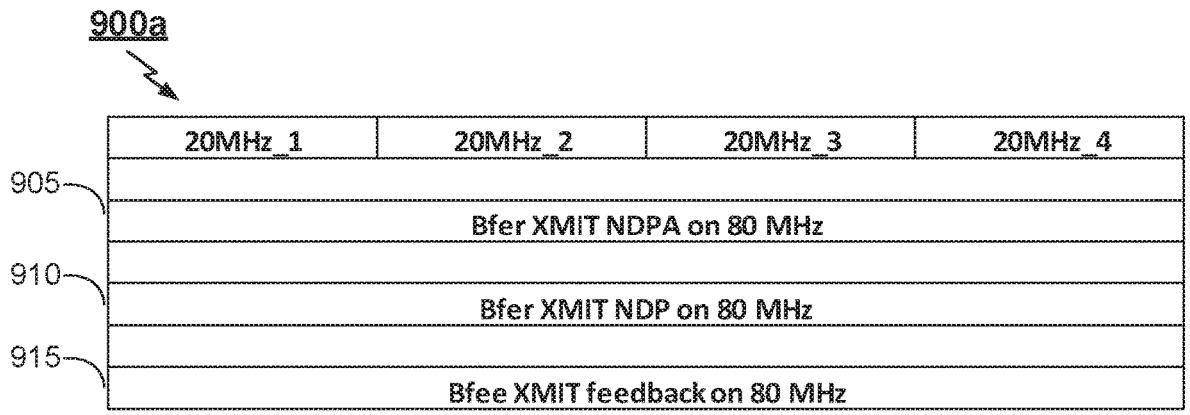
FIG. 9A shows a diagram of an example frame exchange of channel state information (CSI) feedback.

FIG. 9A shows a diagram of an example frame exchange 900*a* of channel state information (CSI) feedback between the AP 110 and the one or more wireless communication devices 120. In FIG. 9A, the channels may not be punctured. Thus, FIG. 9A represents traditional sounding and feedback techniques. The diagram 900*a* depicts an 80 MHz bandwidth divided into 20 MHz channels. The frame exchange 900*a* depicts an NDPA transmission 905 by a beamformer (for example, an AP 110) that corresponds to the HE NDPA 705/720 frame transmissions from FIGS. 7A and 7B. As shown, this NDPA transmission 905 occurs over the full 80 MHz bandwidth. The frame exchange 900*a* further depicts an NDP transmission 910 by the beamformer that corresponds to the NDP 710/725 frame transmissions from FIGS. 7A and 7B. As shown, this NDP transmission 910 also occurs over the full 80 MHz bandwidth. The frame exchange 900*a* further depicts a CSI feedback transmission 915 from a beamformee (for example, the wireless communication device 120) that corresponds to the CSI feedback 715/735 frame transmissions from FIGS. 7A and 7B. As shown, this CSI feedback transmission 915 also occurs over the full 80 MHz bandwidth.

Figure 9B:
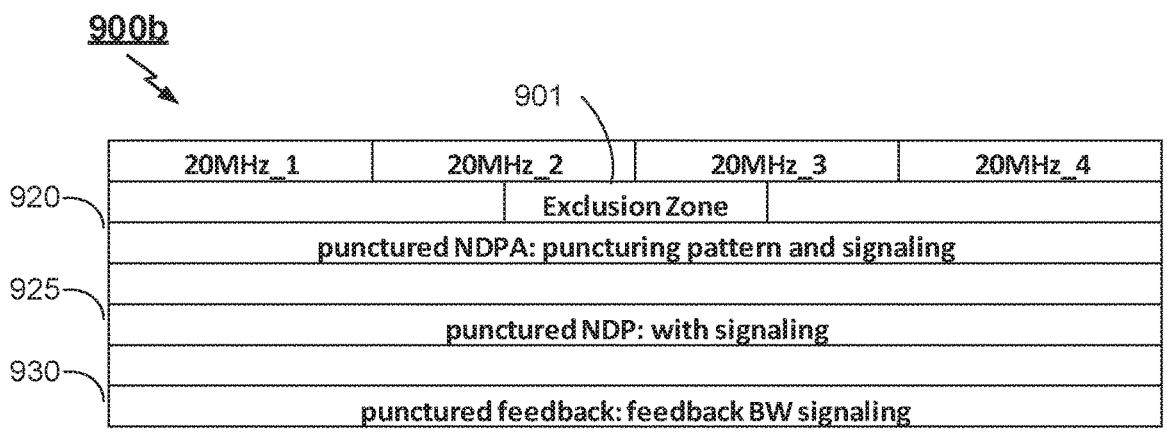
FIG. 9B shows a diagram of another example frame exchange of channel state information (CSI) feedback.

FIG. 9B shows a diagram of another example frame exchange 900b of channel state information (CSI) feedback between the AP 110 and the one or more wireless communication devices 120. The frame exchange 900b depicts an 80 MHz bandwidth divided into 20 MHz channels. The frame exchange 900b also indicates an exclusion zone 901 that spans portions of the 2nd and 3rd 20 MHz channels of the full 80 MHz bandwidth. The frame exchange 900b depicts an NDPA transmission 920 by the beamformer. As shown, this NDPA transmission 920 appears to occur over the full 80 MHz bandwidth. However, because of the exclusion zone 901 that exists in the 2nd and 3rd 20 MHz channels of the full 80 MHz bandwidth, the NDPA transmission 920 may be punctured. Furthermore, the NDPA may indicate information about the puncture, such as the puncturing pattern and instructions to the beamformer. The frame exchange 900b further depicts an NDP transmission 925 by the beamformer. As shown, this NDP transmission 925 also appears to occur over the full 80 MHz bandwidth. However, because of the exclusion zone 901 that exists in the 2nd and 3rd 20 MHz channels of the full 80 MHz bandwidth, the NDP transmission 925 may be punctured. The frame exchange 900a further depicts a CSI feedback transmission 930 from the beamformee. As shown, this NDP transmission 925 also appears to occur over the full 80 MHz bandwidth. However, because of the exclusion zone 901 that exists in the 2nd and 3rd 20 MHz channels of the full 80 MHz bandwidth, the CSI feedback transmission 930 may be punctured. Further details of the puncturing and corresponding signaling will be discussed below.

As shown in the frame exchange 900b of FIG. 9B, the NDPA transmission from the AP 110 to the wireless communication device(s) 120 may overlap an exclusion BW zone that exists spanning portions of the 2nd and 3rd 20 MHz channels. Accordingly, the NDPA transmission 920 may need to coordinate notification of the exclusion BW zone 901 to the wireless communication devices 120 such that no sounding transmissions occur over the exclusion BW zone 901. Additionally, the NDPA transmission 920 may also coordinate sounding transmission such that any portions of 20 MHz channels that include but do not overlap with the exclusion BW zone 901 are not wasted (for example, not lost without sounding transmission or that sounding transmissions that occur in these portions are not lost). As part of the coordinated notification, the AP 110 may puncture the NDPA transmission 920 and the NDP transmission 925. Additionally, the AP 110 may indicate said puncturing of the NDPA transmission 920 and the NDP transmission 925 to the wireless communication device 120. Similarly, the wireless communication device 120 may puncture the CSI feedback 935. Additionally, the wireless communication device 120 may indicate said puncturing of the CSI feedback 935 to the AP 110.

The NDPA transmission 920 may be punctured in any of multiple methods. The puncturing of the NDPA transmission 920 may prevent the NDPA transmission 920 from overlapping the exclusion BW zone 901.

In a first example, the AP 110 may transmit the NDPA transmission 920 using an HE MU PPDU format that is designed for coordinating communications with multiple users. The HE MU PPDU format may support preamble puncturing, which can be used to puncture the NDPA transmission 920 in view of the exclusion BW zone 901. For example, the HE MU PPDU format may allow for puncturing at certain bandwidths. However, the HE MU PPDU format may only allow puncturing at multiples of 20 MHz and only specific combinations of puncturing patterns may be permitted when using the HE MU PPDU format.

In a second example, the AP 110 may transmit the NDPA transmission 920 using duplicate 20 MHz PPDUs, where each 20 MHz PPDU includes the NDPA transmission 920. For example, in the 80 MHz channel bandwidth shown in the frame exchange 900b, each of the 20 MHz channels may include an NDPA transmission 920 as a 20 MHz PPDU. If a puncture is needed in a particular 20 MHz channel, then that particular 20 MHz channel will be punctured. However, because the exclusion BW zones may be misaligned from the 20 MHz channel boundaries, excess BW may be punctured. For example, with the example exclusion BW zone 901 spanning portions of both the 2nd and 3rd 20 MHz channels of the 80 MHz bandwidth, by using the 20 MHz PPDUs each including the NDPA transmission 920, both the 2nd and 3rd 20 MHz channels would be punctured, thus wasting the portions of the 2nd and 3rd 20 MHz channels that do not overlap with the exclusion BW zone 901.

Once the NDPA transmission 920 is punctured, the puncturing may be signaled in various ways. In a first option, management frames may be used (for example, beacons). However, since management frames (for example, the beacons) are communicated in a periodic manner, information communicated in the beacons may be PPDU specific or may not be changed on a per PPDU basis. For example, if the beacons are communicated at 100 millisecond (ms) intervals, then every 100 ms there will be an announcement that a particular section of bandwidth is to be treated as an exclusion BW zone 901. Since PPDUs have durations that may be less than the 100 ms beacon interval, each PPDU may not be adapted to an additional (or not previously identified) exclusion BW zone 901. Accordingly, the management frame indication may be a semi-static indication of exclusion BW zones 901.

In a second option, for example when using an HE MU PPDU frame format to communicate the NDPA transmission 920, the punctured NPDA transmission 920 may be indicated using one or more values or bits in the HE signaling (SIG) A field of the HE MU PPDU frame format. Accordingly, the NDPA may leverage the preamble puncturing indications of the HE MU PPDU.

The NDP transmission 925 may be punctured in any of multiple methods. The puncturing of the NDP transmission 925 may prevent the NDP transmission 925 from overlapping the exclusion BW zone 901.

The AP 110 may utilize a HE SU PPDU format for transmission of the NDP transmission 925 along with a tone-based puncturing scheme. While the HE SU PPDU format exists in communication schemes, the HE SU PPDU format does not define how to puncture HE SU PPDUs. Given that the HE SU PPDU frame bandwidths are in multiples of 20 MHz, the AP 110 may define tone-based puncturing schemes that are able to identify one or more ranges of subcarriers (for example, subcarrier x to subcarrier y) that are being punctured, where multiple start and end subcarriers may be identified to indicate multiple exclusion BW zones. Thus, puncturing of HE SU PPDUs may be enabled. Such puncturing may be beneficial in view of the flexibility afforded by indicating only start and end subcarrier indices.

The puncturing of the NDP transmission 925 may be indicated using various options. As a first option, management frames (for example, beacons) that are broadcast frames that all wireless communication devices 120 receive are employed. However, as noted above, use of the management frames may be semi-static.

As a second option, the AP 110 may use the STA info field 830 of the NDPA frame 800 as shown in FIG. 8. For example, the AP 110 may use a specific STA info field 830 for inclusion in the NDPA frame 800, where the specific STA info field 830 identifies the punctured zones. For example, an AID of 0 in the STA info field 830 may identify the specific STA info field 830 identifying punctured zones and only those wireless communication devices 120 that understand the specific STA info field 830 identifying the punctured zones or BWs may resolve the specific STA info field 830. For example, if the wireless communication device 120 is asked to provide feedback on a particular channel, the AP 110 will identify in the NDPA transmission (for example, via the STA info fields 830) all punctured channel ranges in the 80 MHz BW to the wireless communication device 120. Accordingly, the wireless communication device 120 may provide CSI channel feedback for all portions of the 80 MHz BW except for the range(s) identified in the STA info fields 830. Alternatively, multiple STA info fields 830 may be used to identify non-punctured zones or BWs. For example, if a wireless communication device 120 is asked to provide feedback on a particular channel, the AP 110 will identify in the NDPA transmission (for example, via the STA info fields 830) all non-punctured channel ranges in the 80 MHz BW to the wireless communication device 120. Accordingly, the wireless communication device 120 may provide CSI channel feedback for all portions of the 80 MHz BW that are identified in the STA info fields 830. In this embodiment, Start and End resource unit (RU) indices indicated in the Partial BW Info field in the NDPA may be swapped. Thus, in some embodiments, when the Start RU identifier or number is greater than the End RU identifier or number, the wireless communication device 120 may understand that the STA info field 830 identifies a punctured NDP indication and may continue processing the STA info fields 830 in search of other STA info fields 830 (or other fields) addressed to wireless communication device 120.

As a third option, the HE SIG-A field of the NDP (since using the HE SU PPDU format) may be leveraged to signal NDP puncturing. For example, since the NDP includes a null payload, all fields and bits in the preamble that relate to the payload may be repurposed. Accordingly, the HE SIG-A field, which generally relates to signaling of the payload, may be repurposed to indicate a puncturing pattern used in the 80 MHz BW.

As a fourth option, non-trigger based (TB) sounding may be indicated with a puncture pattern in a management frame. For example, a management frame (such as a beacon frame) may provide global information about punctured BW. The management frame may indicate subchannels or RUs that are being punctured. A beamforming transmitter may send an NDPA that indicates the start and end RU index of the feedback BW. The beamformee (aware of puncture channels or RUs) may remove the punctured BW from the feedback BW. The beamformee, if capable of punctured transmissions, may transmit the beamforming feedback on punctured BW. Otherwise, the beamformee may transmit the beamforming feedback on largest contiguous non-punctured BW in the channel.

A fifth option may include indicating non-TB sounding with a puncture indication in the NDPA using dynamic puncturing. In some implementations of the fifth option, devices may be capable of storing and/or accessing information from the received NDPA.

A sixth option may include indicating non-TB sounding with a puncturing indication in the NDPA and the management frame using dynamic puncturing. For example, the NDPA may indicate one or more punctures and may indicate a single STA Info field. The STA Info Field has reserved values 74-127, which are reserved for RU Start Index and RU End Index. In this implementation, when the Start RU Index is set to 126 or 127, the puncture pattern may be indicated through a bitmap. For example, eight bits may indicate status of either 20 MHz subchannels or 242 RUs arranged in order of ascending (or descending) frequency. A first value (such as "0") may indicate the subchannel or RUs are punctured while a second value (such as "1") may indicate the subchannel or RUs are not punctured. The puncture pattern may be identical to a puncture pattern distributed by a management frame. Because the beamformee becomes aware of the puncture subchannels or RUs, the beamformee may remove the punctured BW from the feedback BW. The beamformee, if capable of punctured transmissions, may transmit the beamforming feedback on punctured BW. Otherwise, the beamformee may transmit the beamforming feedback on largest contiguous non-punctured BW in the channel.

In some embodiments, one or more of these options may include parameters or capability indicators for indicating whether the beamformer (for example, the AP 110) and/or the beamformee (for example, the wireless communication device 120) are capable of dynamic puncture sounding. For example, a capabilities field (such as an HE MAC Capabilities information field in a management message) may indicate whether the device supports punctured sounding.

The wireless communication device 120 may puncture the CSI feedback transmission 735 using various options. The puncturing of the NDPA transmission 920 may prevent the NDPA transmission 920 from overlapping the exclusion BW zone 901. In a first option, the wireless communication device 120 may simply reuse the HE SU PPDU with the tone-based puncturing scheme as described above. In a second option, the wireless communication device 120 may utilize a HE trigger based (TB) PPDU, which naturally supports punctured UL transmissions. In a third option, the wireless communication device 120 may utilize a HE MU PPDU frame for the UL transmission. The wireless communication device 120 may not need to signal puncturing of the CSI feedback transmission 735 when the punctured CSI feedback 735 is transmitted in response to the punctured NDPA transmission 720 and the punctured NDP transmission 725. Accordingly, the puncturing pattern may be known in view of the patterns provided in the NDPA transmission 720 and the NDP transmission 725.

Given the options described herein regarding puncturing of NPDA transmissions 720, NDP transmissions 725, and CSI feedback transmission 735 (and corresponding signaling), various combinations of these options may provide different overall solutions.

In a solution involving reduced changes to frame formats and communications, the AP 110 may utilize the HE MU PPDU format for the punctured NDPA transmission 725. Alternatively, the AP 110 may utilize the duplicate NDPA transmissions 725 in 20 MHz PPDUs across each of the 20 MHz channel bandwidths for the punctured NDPA transmission 725. The AP 110 may utilize the HE SU PPDU frame with a tone-based puncturing plan for the punctured NDP transmission 725. While the NDPA transmission 720 and the NDP transmission 725 are both punctured, neither of the punctured transmissions may be indicated to the receiving wireless communication device 120. For example, no indication of the puncturing of the NDPA transmission 720 or the NDP transmission 725 may be provided to the wireless communication device 120. However, if the puncturing is not being communicated to the wireless communication device 120, the AP 110 may verify that the HE SIG A field of the NDP transmission 725 is set to 1 to avoid smoothing operations at the wireless communication device 120. Alternatively, the AP 110 may indicate the puncturing pattern in the NDP transmission 725 using the HE SIG A field of the preamble of the NDP transmission 725 (for example, repurposing bits in the HE SIG A field since there is a null payload). Such indication may assist the wireless communication device 120 to perform smoothing operations. Additionally, the AP 110 may indicate the puncturing pattern in the management frame (for example, beacons). Such indication in the management frames may be preferred because it allows the AP 110 to transmit the NDP transmission 725 using a frame format that does not include pre-HE modulated fields while transmitting on a 20 MHz BW. Accordingly, the NDP transmission 725 that does not include the pre-HE modulated fields may be transmitted on sub-20 MHz BW channels (for example, those portions that result from presence of the exclusion BW zone in only a portion of the 20 MHz BW channel). The pre-HE modulated fields that are not included may be the L-STF, L-LTF, L-SIG, RL-SIG, HE-SIG-A fields.

The CSI feedback transmission 735 may be communicated by the wireless communication device 120 using the HE TB PPDU format. If the wireless communication device 120 is unaware of the puncture pattern and the puncturing of the NDPA transmission 720 and the NDP transmission 725 (for example, the option described above where the puncture pattern is not indicated in the NDP transmission 725), the wireless communication device 120 may transmit its channel feedback (for example, the CSI feedback transmission 735) on all sub-carriers to the AP 110, regardless of their actual punctured or non-punctured status. Such an implementation may allow the wireless communication device 120 to operate without knowledge of any puncturing and allows for CSI measurement and feedback generation of the entire range of sub-carriers, included the exclusion BW zone. In such an implementation, the AP 110 may be configured to reconstruct the feedback after eliminating the exclusion BW zone 901 from the feedback. Alternatively, if the wireless communication device 120 is aware of the puncturing and the puncture pattern, the wireless communication device 120 may prepare a channel estimate (for example, perform CSI measurements) on the entire range of sub-carriers, including the exclusion BW zone, before adjusting the average signal-to-noise ratio (SNR) in the CSI feedback transmission 735 to account for the exclusion BW zone 901. Such an adjustment (removal of any contributions from the exclusion BW zone) may be achieved by methods such as average SNR scaling in the baseband, etc.

In another implementation, enhanced punctured sounding may be implemented by the AP 110 and the wireless communication device 120. For example, the AP 110 may utilize the HE MU PPDU frame format for the NDPA transmission 720. In the NDPA transmission 720, the AP 110 may reuse STA info fields 830 to identify multiple usable segments or ranges of the BW that are available for communication (for example, excluding the exclusion BW zone) and the reused STA info fields 830 identifying the multiple usable segment or ranges of the BW may be assigned to the wireless communication device 120. For example, the STA info fields 830 that identify the usable segments or ranges of the BW may have AIDs 850 that are equal to the AID of the wireless communication device 120. Alternatively, the AP 110 may use the STA info fields 830 to identify one or more exclusion BW zones, for example identifying start and end resource units (RUs) or sub-carriers corresponding to the exclusions BW zone(s). The AP 110 may utilize the HE SU PPDU frame with a tone-based puncturing plan for the punctured NDP transmission 725. While the NDPA transmission 720 and the NDP transmission 725 are both punctured, neither of the punctured transmissions may be indicated to the receiving wireless communication device 120. For example, no indication of the puncturing of the NDPA transmission 720 or the NDP transmission 725 may be provided to the wireless communication device 120. However, if the puncturing is not being communicated to the wireless communication device 120, the AP 110 may verify that the HE SIG A field of the NDP transmission 725 is set to 1 to avoid smoothing operations at the wireless communication device 120. Alternatively, the AP 110 may indicate the puncturing pattern in the NDP transmission 725 using the HE SIG A field of the preamble of the NDP transmission 725 (for example, repurposing bits in the HE SIG A field since there is a null payload). Such indication may assist the wireless communication device 120 to perform smoothing operations. Additionally, the AP 110 may indicate the puncturing pattern in the management frame (for example, beacons). Such indication in the management frames may be preferred because it allows the AP 110 to transmit the NDP transmission 725 using a frame format that does not include pre-HE modulated fields while transmitting on a 20 MHz BW. Accordingly, the NDP transmission 725 that does not include the pre-HE modulated fields may be transmitted on sub-20 MHz BW channels (for example, those portions that result from presence of the exclusion BW zone in only a portion of the 20 MHz BW channel). The pre-HE modulated fields that are not included may be the L-STF, L-LTF, L-SIG, RL-SIG, HE-SIG-A fields.

The CSI feedback transmission 735 in this implementation may occur only for non-punctured channels in the 80 MHz BW. Accordingly, the wireless communication device 120 are aware of the exclusion BW zone(s) and the corresponding puncturing and will refrain from providing feedback to the AP 110 regarding the punctured channels. In a first option of this implementation, the CSI feedback transmission 735 may utilize a HE SU PPDU frame format with the tone-based puncturing plan. In a second option, the CSI feedback transmission 735 may utilize a HE TB PPDU without the pre-modulated HE fields. In a third option, the CSI feedback transmission 735 may utilize a HE MU PPDU frame format on the UL with extension of available and usable BWs and RUs. The CSI feedback transmission 735 may be communicated by the wireless communication device 120 using the HE TB PPDU format. If the wireless communication device 120 is unaware of the puncture pattern and the puncturing of the NDPA transmission 720 and the NDP transmission 725 (for example, the option described above where the puncture pattern is not indicated in the NDP transmission 725), the wireless communication device 120 may transmit its channel feedback (for example, the CSI feedback transmission 735) on all sub-carriers to the AP 110, regardless of their actual punctured or non-punctured status. Such an implementation may allow the wireless communication device 120 to operate without knowledge of any puncturing and allows for CSI measurement and feedback generation of the entire range of sub-carriers, included the exclusion BW zone. In such an implementation, the AP 110 may be configured to reconstruct the feedback after eliminating the exclusion BW zone from the feedback.

Alternatively, if the wireless communication device 120 is aware of the puncturing and the puncture pattern, the wireless communication device 120 may prepare a channel estimate (for example, perform CSI measurements) on the entire range of sub-carriers, including the exclusion BW zone, before adjusting the average signal-to-noise ratio (SNR) in the CSI feedback transmission 735 to account for the exclusion BW zone. Such an adjustment (removal of any contributions from the exclusion BW zone) may be achieved by methods such as average SNR scaling in the baseband, etc.

In the first implementation, the CSI feedback transmission 735 may include exclusion BW zone feedback. Accordingly, the AP 110 must perform extra processing to compensate for the included feedback for the excluded BW zone(s). In the second implementation, the CSI feedback transmission 735, being aware of the exclusion BW zones, is able to remove or refrain from including any feedback regarding the excluded BW zone 901 before transmitting the CSI feedback transmission 735, thereby reducing processing by the AP 110.

The AP 110 and the wireless communication device 120 may utilize the HE SU PPDU frame format with the tone-based puncturing plan. In some embodiments, the legacy HE SU PPDU frame format may utilize 242/484/996/2*996-tone RU sizes and may not define puncturing with an SU tone plan. In some embodiments, the AP 110 and the wireless communication device 120 may utilize a sub-carrier (tone) index based 11ax SU tone plan puncturing where RU sizes and corresponding start and end sub-carrier indices of the SU tone plan are provided and where the RU size and location(s) for punctured ranges (for example, exclusion BW zone) are identified to identify the punctured positions. Alternatively, the AP 110 and the wireless communication device 120 may indicate start and end sub-carrier indices for punctured zones without identifying fixed RU sizes.

Figure 10:
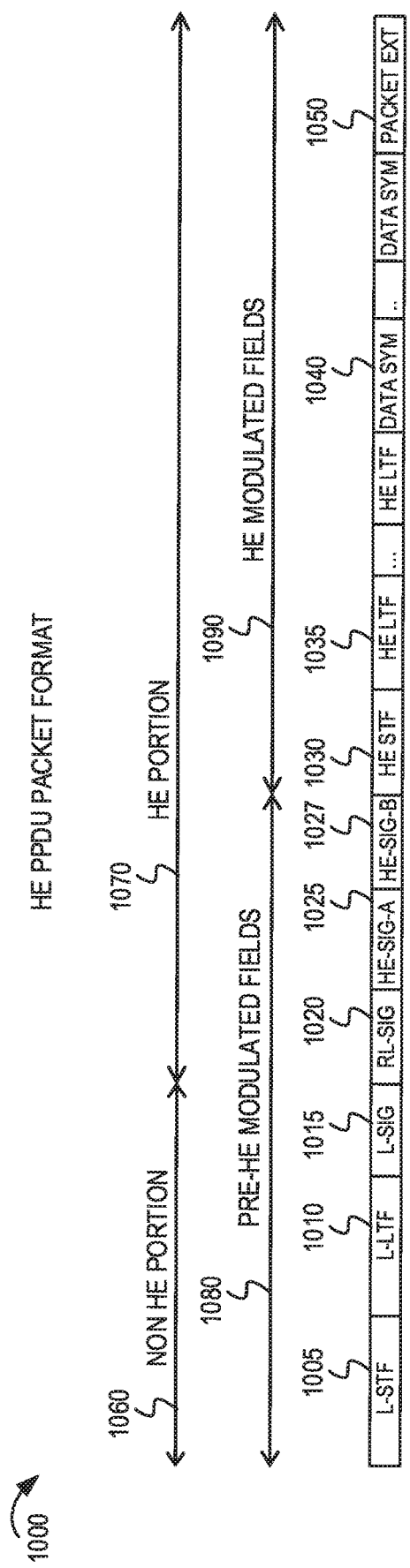
FIG. 10 shows an exemplary frame format for a high-efficiency (HE) physical layer convergence protocol data unit (PPDU).

FIG. 10 shows an exemplary frame format for a high-efficiency (HE) physical layer convergence protocol data unit (PPDU). The HE packet format 1000 (also referred to as a physical layer packet data unit, or HE PPDU) shows a non-HE portion 1060. The non-HE portion 1060 includes a legacy short training field 1005 (L-STF), a legacy long training field 1010 (L-LTF), and a legacy signal field 1015 (L-SIG). The remaining portion of the PPDU is considered an HE modulated portion 1070 because it includes features that are relevant to devices capable of HE transmissions. The pre-HE modulated fields 1080 include the non-HE portion 1060 as well as some fields to bootstrap the HE modulated fields 1090. For example, the pre-HE modulated fields 1080 may further include a repeated legacy signal field 1020 (RL-SIG), a first HE signal field 1025 (HE-SIG-A), and a second HE signal field 1027 (HE-SIG-B). The repeated legacy signal field 1020 and the HE signal field 1025 may be modulated using a more reliable (robust) modulation than has lower throughput than the modulation scheme using for the HE modulated fields 1090.

The HE modulated fields 1090 includes an HE short training field 1030 (HE STF), one or more symbols for an HE long training field 1035 (HE LTF), one or more data symbols 1040, and may include a packet extension field 1050. The HE modulated fields 1090 is modulated using inverse fast Fourier transform (IFFT) to convert the signal to orthogonal carrier transmissions in the time domain. During the IFFT phase, the EHT modulated fields 10101 may be modulated across all the frequencies (including available frequencies not overlapping the Exclusion BW Zone in the non-punctured portions of channels).

Figure 11:
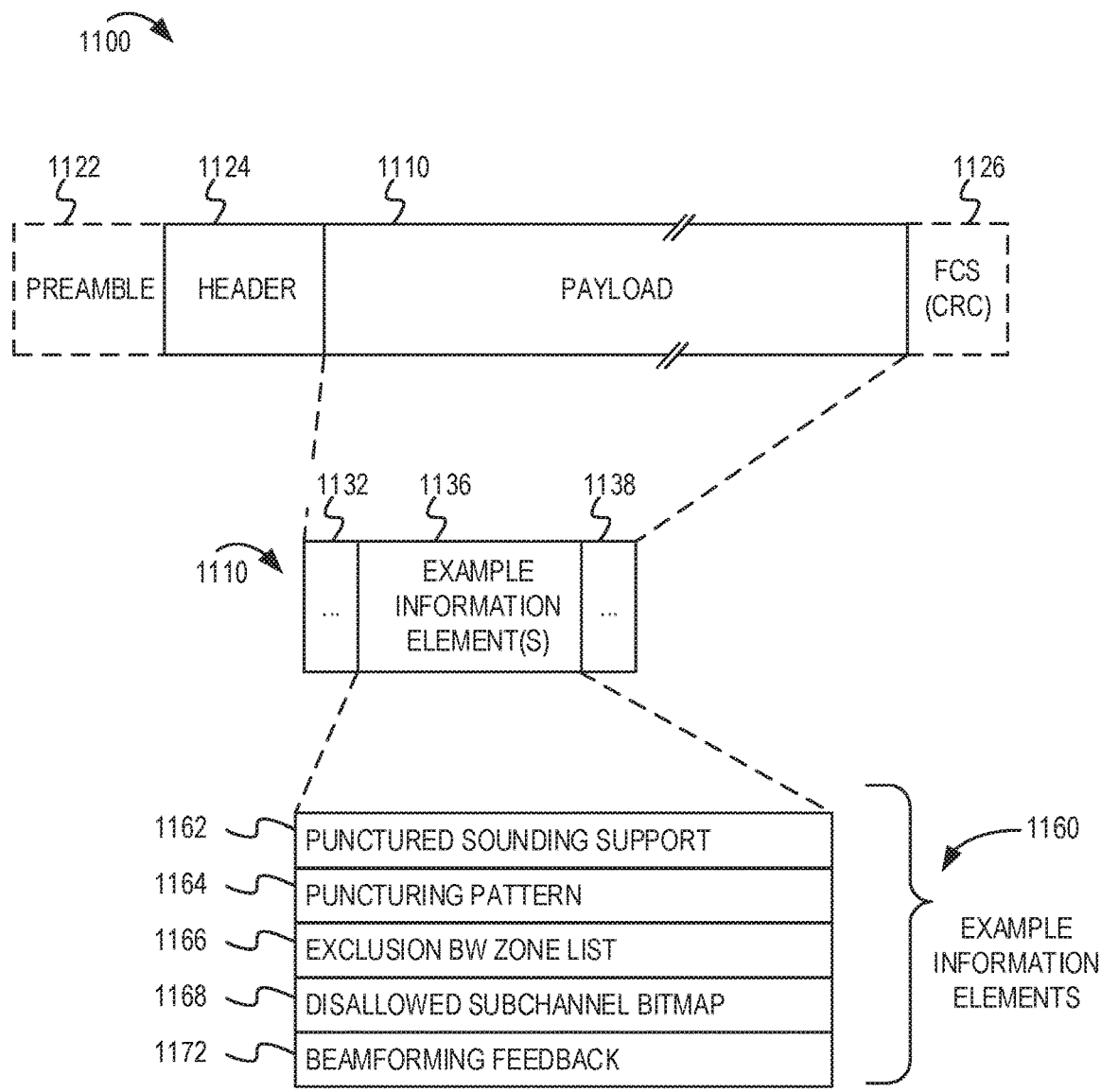
FIG. 11 depicts a conceptual diagram of an example management frame, sounding frame, or feedback frame.

FIG. 11 depicts a conceptual diagram of an example management frame, sounding frame, or feedback frame. For example, the example management frame, sounding frame, or feedback frame (referred collectively in different examples as the frame 1101) may be sent from an AP to a STA or from a STA to an AP. In some implementations, the frame 1101 may include or be included in a configuration message. The frame 1101 may be defined by the IEEE 802.11 specification for configuring a WLAN or for establishing an association. In some implementations, the frame 1101 may be a legacy management frame that is modified or extended to include capability or configuration information to support partial channel puncturing. In some other implementations, the frame 1101 may be a new management frame created to facilitate punctured sounding between two WLAN devices.

One example of the frame 1101 may include an enhanced beacon frame that may be used by IEEE 802.11 (similar to the beacon frames defined for IEEE 802.11ax). Another example of a frame 1101 may be an NDPA or NDP frame for punctured sounding. In another example, the frame 1101 may be a feedback frame that includes feedback based on the punctured sounding.

The example frame 1101 may include a header 1124 and a payload 1110. In some implementations, the header 1124 may include source addresses (such as the network address of the sending AP), the length of data frame, or other frame control information. The payload 1110 may be used to convey punctured sounding and feedback capability or configuration information. The punctured sounding and feedback capability or configuration information may be organized or formatted in a variety of ways.

In some implementations, the example frame 1101 may include a preamble 1122. The preamble 1122 may be used, for example, when the transmission is non-triggered or non-scheduled. In some implementations, the preamble may be omitted for triggered or scheduled transmissions. When the preamble is present, the preamble 1122 may include one or more bits to establish synchronization. The example frame 1101 may include an optional frame check sequence (FSC) 1126. The payload 1111 may be organized with a message format and may include information elements 1132, 1136, and 1138.

Several examples of information elements 1160 are illustrated in FIG. 11. The information elements 1160 may include a punctured sounding support indicator 1162. For example the punctured sounding support indicator 1162 may be used to indicate whether the WLAN device supports the punctured sounding features in this disclosure. In some implementations, the information elements 1160 may include a puncturing pattern 1164. In some implementations, the puncturing pattern 1164 may be based on subchannel or RU indexes. In some implementations, the information elements 1160 may include an Exclusion BW Zone List 1166 which the WLAN device will use for determining which frequencies to exclude when performing punctured sounding.

In some implementations, the information elements 1160 may include a disallowed subchannel bitmap. For example, punctured sounding may be indicated by the inclusion of a non-zero Disallowed Subchannel Bitmap subfield in the NDPA frame. In such a case, the disallowed subchannels are applied to the tone information to be included in the feedback after selecting tones for feedback based on the RU Start Index and RU End Index subfield values and NDPA frame bandwidth. The Disallowed Subchannel Bitmap subfield may indicate which 20 MHz subchannels and which 242- tone RUs are present in NDP PPDUs announced by the NDPA and which 242-RUs are to be included in requested sounding feedback. A 20 MHz subchannel is as defined in clause 17 (Orthogonal frequency division multiplexing (OFDM) PHY specification) for the portions of the PPDU that use a tone plan for a frequency band and a 242-tone RU is defined as a subcarrier and resource allocation. The lowest numbered bit of the Disallowed Subchannel Bitmap subfield may correspond to the 20 MHz subchannel that lies within the BSS width and that has the lowest frequency of the set of all 20 MHz subchannels within the BSS width. Each successive bit in the bitmap may correspond to the next higher frequency 20 MHz subchannel. A bit in the bitmap may be set to 1 to indicate that for the corresponding 20 MHz subchannel, no energy is present in the NDP frames associated with this NDPA frame. For each disallowed 20 MHz subchannel, the 242-tone RU that is most closely aligned in frequency with the 20 MHz subchannel may be disallowed for PPDUs that use a tone plan. STAs addressed by the NDPA frame may not include tones from disallowed 242-tone RUs when determining the average SNR of space time streams 1 to Nc and when generating requested sounding feedback. If a 20 MHz subchannel and its corresponding 242-tone RU is not disallowed, the corresponding bit in the bitmap may be set to 0.

The information elements 1160 may include a field to indicate beamforming feedback 1172. In some implementations, the beamforming feedback may be a compressed beamforming report. For example, the compressed beamforming report may not include information for tones that are included within 242-tone RUs that are indicated as disallowed by the disallowed subchannel bitmap in the NDPA.

Figure 12:
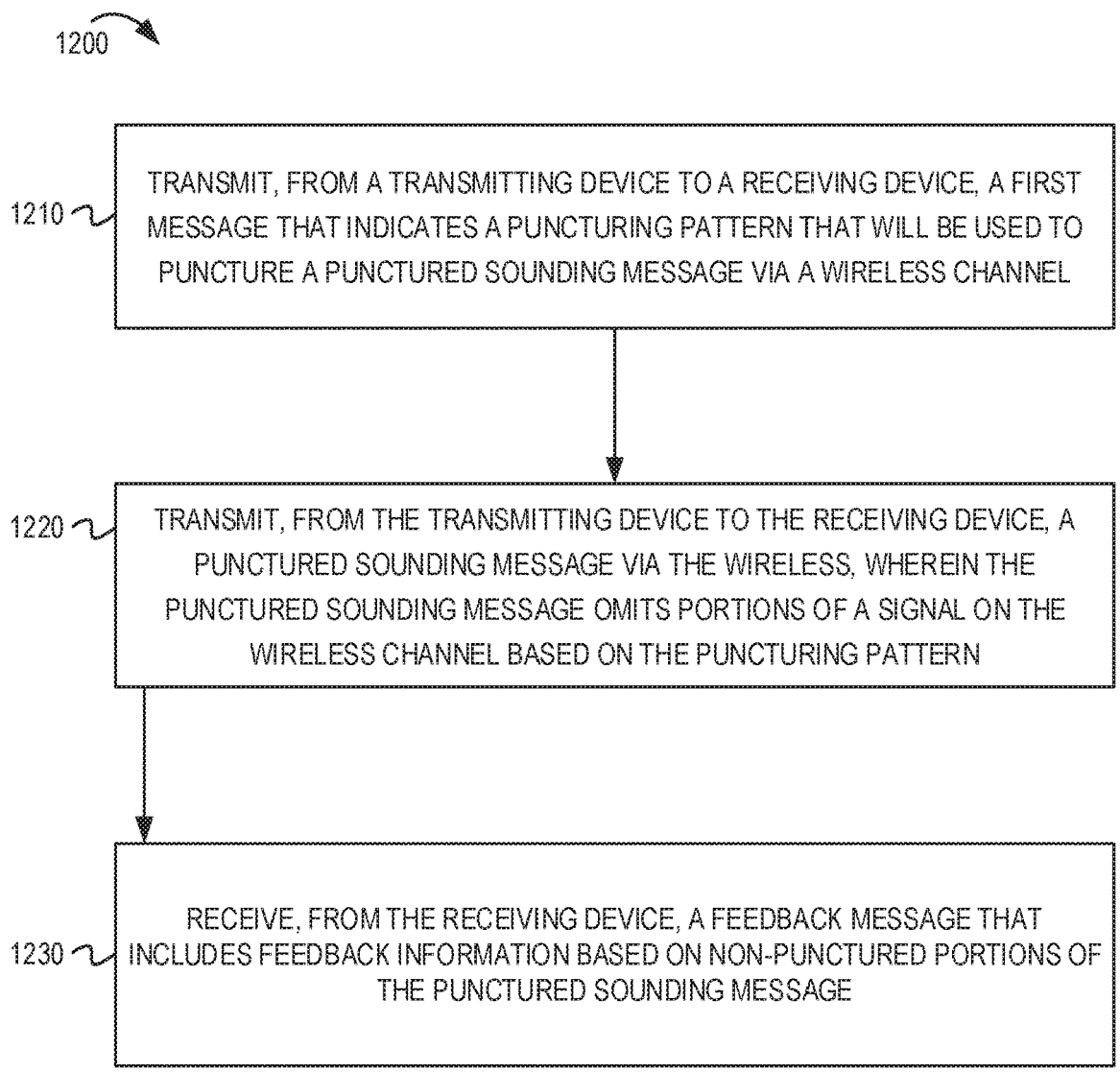
FIG. 12 depicts a flowchart for punctured sounding.

FIG. 12 depicts a flowchart for punctured sounding. In some implementations, the process 1200 begins in block 1210 with transmitting from a transmitting device to a receiving device, a first message that indicates a puncturing pattern that will be used to puncture a punctured sounding message via a wireless channel. For example, the first message may be an NDPA.

At block 1220, the process 1200 proceed with transmitting, from the transmitting device to the receiving device, a punctured sounding message via the wireless, wherein the punctured sounding message omits portions of a signal on the wireless channel based on the puncturing pattern. For example, the punctured sounding message may be an NDP with punctured subchannels or subcarriers. At block 1230, the process 1200 proceeds with receiving, from the receiving device, a feedback message that includes feedback information based on non-punctured portions of the punctured sounding message.

Figure 13:
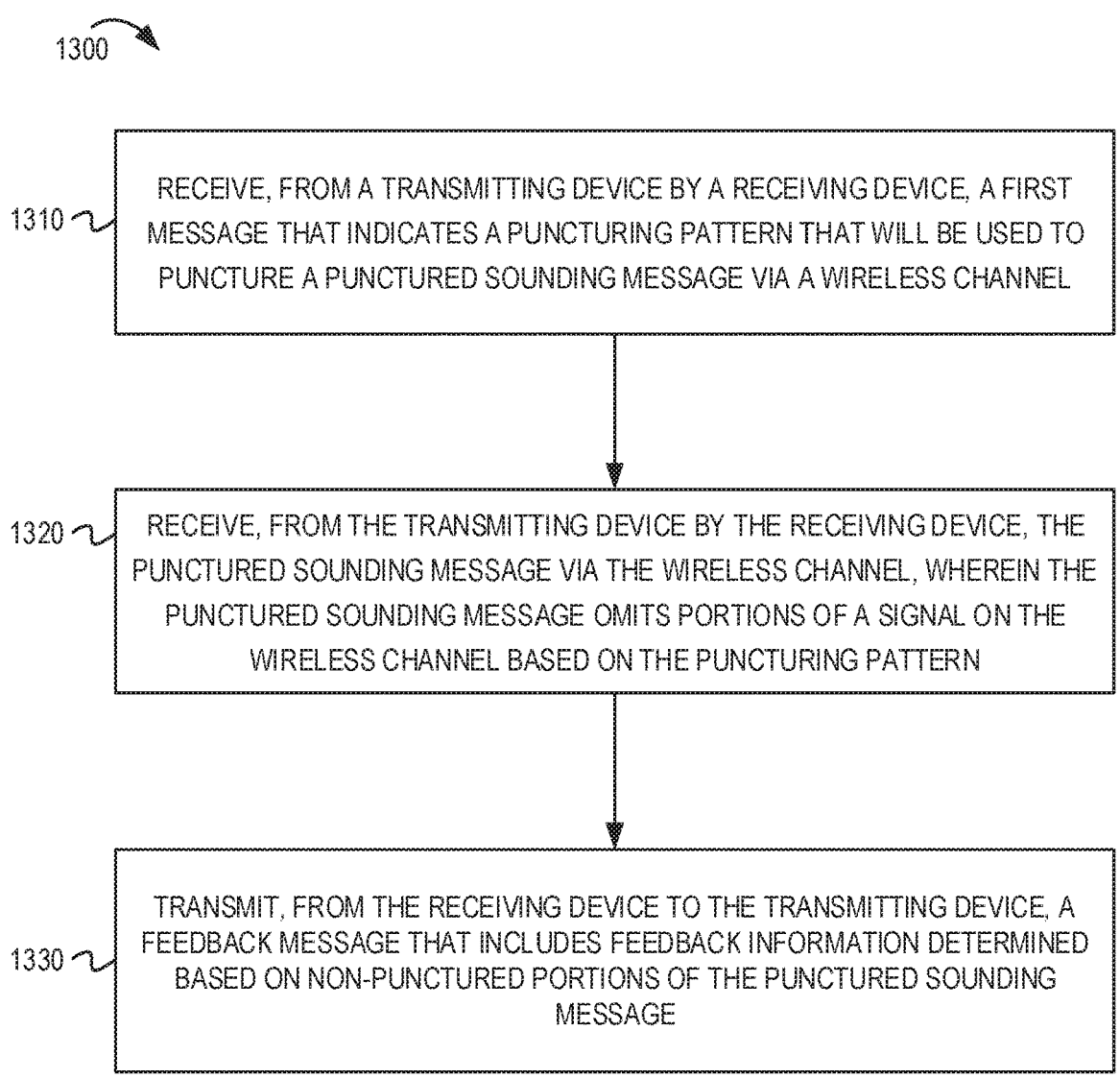
FIG. 13 depicts a flowchart for providing feedback based on punctured sounding.

FIG. 13 depicts a flowchart for providing feedback based on punctured sounding. In some implementations, the process 1300 begins in block 1310 with receiving, from a transmitting device by a receiving device, a first message that indicates a puncturing pattern that will be used to puncture a punctured sounding message via a wireless channel. For example, the first message may be an NDPA.

At block 1320, the process 1300 proceed with receiving, from the transmitting device by the receiving device, a punctured sounding message via the wireless channel, wherein the punctured sounding message omits portions of a signal on the wireless channel based on the puncturing pattern. For example, the punctured sounding message may be an NDP message.

At block 1330, the process 1300 proceeds with transmitting, from the receiving device to the transmitting device, a feedback message that includes feedback information based on non-punctured portions of the punctured sounding message.

In some implementations, the puncturing pattern may include a disallowed subchannel bitmap that identifies which subchannels or resource units are punctured. The puncturing pattern may identify subchannels based on 20 MHz channels in a tone map for a frequency band. The puncturing pattern may identify groups of subcarriers (associated with RUs) in a tone map for a frequency band.

Figure 14:
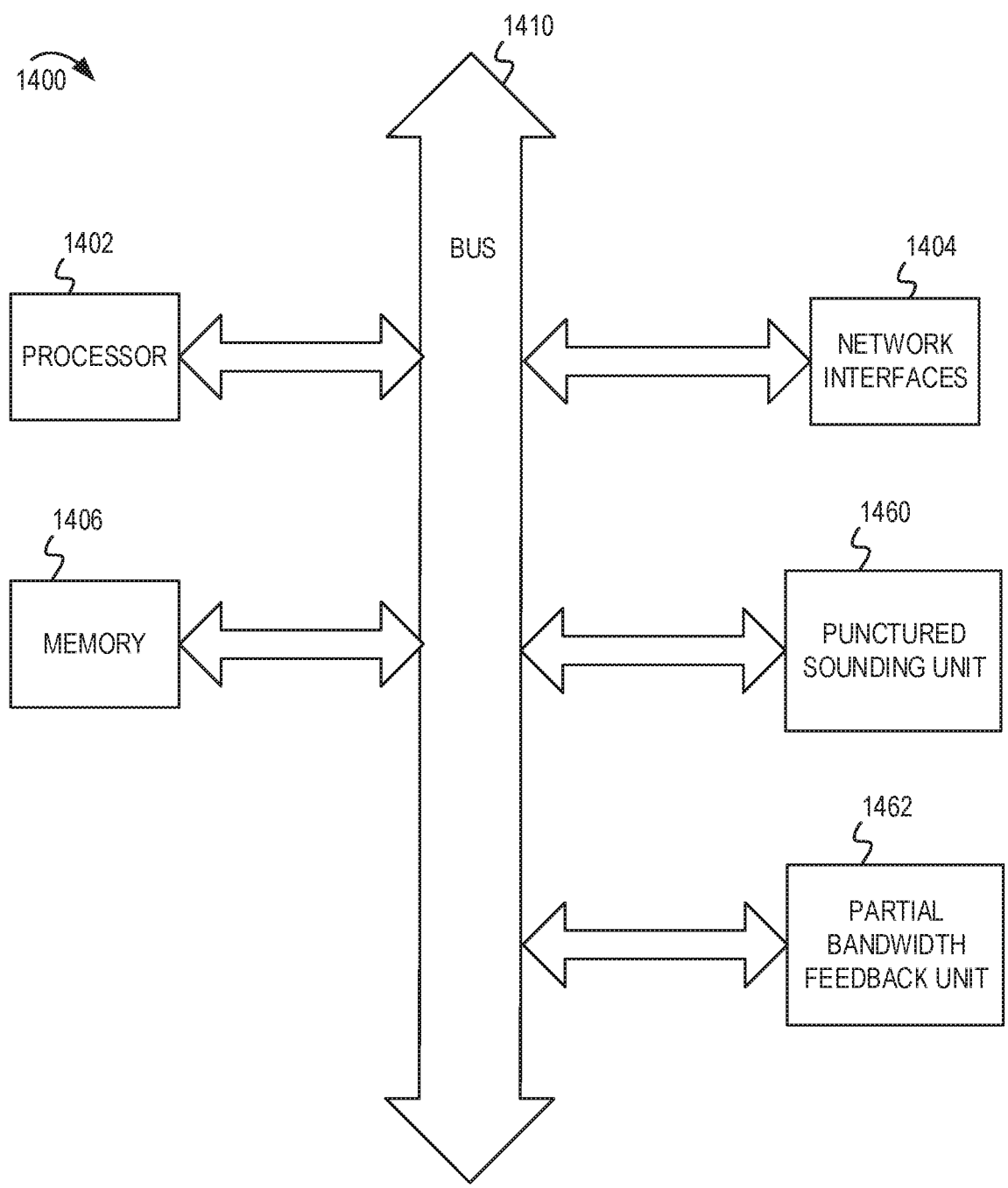
FIG. 14 shows a block diagram of an example electronic device for implementing aspects of this disclosure.

FIG. 14 shows a block diagram of an example electronic device for implementing aspects of this disclosure. In some implementations, the electronic device 1400 may be a WLAN apparatus, such as an access point (including any of the APs described herein), a range extender, a wireless station (including any of the STAs described herein) or other electronic systems. The electronic device 1400 can include a processor unit 1402 (possibly including multiple processors, multiple cores, multiple nodes, or implementing multi-threading, etc.). The electronic device 1400 also can include a memory unit 1406. The memory unit 1406 may be system memory or any one or more of the possible realizations of computer-readable media described herein. The electronic device 1400 also can include a bus 1410 (such as PCI, ISA, PCI-Express, HyperTransport®, InfiniBand®, NuBus,® AHB, AXI, etc.), and a network interface 1404 that can include at least one of a wireless network interface (such as a WLAN interface, a Bluetooth® interface, a WiMAX® interface, a ZigBee® interface, a Wireless USB interface, etc.) and a wired network interface (such as an Ethernet interface, a powerline communication interface, or the like). In some implementations, the electronic device 1400 may support multiple network interfaces—each of which is configured to couple the electronic device 1400 to a different communication network.

The electronic device 1400 may include a punctured sounding unit 1460 and a partial bandwidth feedback unit 1462. In some implementations, the punctured sounding unit 1460 or the partial bandwidth feedback unit 1462 can be distributed within the processor unit 1402, the memory unit 1406, and the bus 1410. The punctured sounding unit 1460 and the partial bandwidth feedback unit 1462 can perform some or all of the operations described herein. For example, the punctured sounding unit 1460 may coordinate with an IFFT or FFT block of a radio transmitter to perform puncturing when transmitting or to decode a punctured sounding message (such as an NDP). The punctured sounding unit 1460 also may implement the NDPA (sending or receiving) that includes a puncturing pattern (such as a disallowed subchannel bitmap). The partial bandwidth feedback unit 1462 may perform one or more of the feedback techniques in this disclosure. For example, the partial bandwidth feedback unit 1462 may prepare and send feedback based on the non-punctured portions of a punctured sounding message. In some implementations, the feedback may be a compressed feedback message based on the average SNR or the non-punctured portions of the punctured sounding message. Furthermore, the partial bandwidth feedback unit 1462 may prepare or use beamforming feedback based on the punctured sounding.

The memory unit 1406 can include computer instructions executable by the processor unit 1402 to implement the functionality of the implementations described in FIGS. 1-13. Any of these functionalities may be partially (or entirely) implemented in hardware or on the processor unit 1402. For example, the functionality may be implemented with an application specific integrated circuit, in logic implemented in the processor unit 1402, in a co-processor on a peripheral device or card, etc. Further, realizations may include fewer or additional components not illustrated in FIG. 14 (such as video cards, audio cards, additional network interfaces, peripheral devices, etc.). The processor unit 1402, the memory unit 1406, and the network interface 1404 are coupled to the bus 1410. Although illustrated as being coupled to the bus 1410, the memory unit 1406 may be coupled to the processor unit 1402.

In some implementations, the electronic device 1400 can be an example of an apparatus for use in a WLAN apparatus such as AP 110, STA 120, AP 1010, STA 1020, or the like. For example, the electronic device 1400 can be a chip, system on chip (SoC) or chipset that includes one or more interfaces (for example, a Wi-Fi (IEEE 802.11) modem or a cellular modem). In other instances, the electronic device 1400 can be a STA or AP that includes such a chip, SoC or chipset as well as at least one transceiver and at least one antenna.

FIGS. 1-14 and the operations described herein are examples meant to aid in understanding example implementations and should not be used to limit the potential implementations or limit the scope of the claims. Some implementations may perform additional operations, fewer operations, operations in parallel or in a different order, and some operations differently.

A person/one having ordinary skill in the art would understand that information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof Various modifications to the implementations described in this disclosure can be readily apparent to those skilled in the art, and the generic principles defined herein can be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

As used herein, a phrase referring to "at least one of" a list of items refers to any combination of those items, including single members. As an example, "at least one of: A, B or C" is intended to cover A or B or C or A and B or A and C or B and C or A, B and C or 2A or 2B or 2C and so on.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

As used herein, the term interface may refer to hardware or software configured to connect two or more devices together. For example, an interface may be a part of a processor or a bus and may be configured to allow communication of information or data between the devices. The interface may be integrated into a chip or other device. For example, in some aspects, an interface may comprise a receiver configured to receive information or communications from a device at another device. The interface (for example, of a processor or a bus) may receive information or data processed by a front end or another device or may process information received. In some aspects, an interface may comprise a transmitter configured to transmit or communicate information or data to another device. Thus, the interface may transmit information or data or may prepare information or data for outputting for transmission (for example, via a bus).

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, for example, a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers.

Thus, in some aspects computer readable medium may comprise non-transitory computer readable medium (for example, tangible media). In addition, in some aspects computer readable medium may comprise transitory computer readable medium (for example, a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (for example, RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

While the foregoing is directed to aspects of the present disclosure, other and further aspects of the disclosure may be devised without departing from the basic scope thereof, and the scope thereof is determined by the claims that follow.

What is claimed is:

1. A method of communication in a wireless network, comprising:
    transmitting, from a transmitting device to a receiving device, a first message that indicates a puncturing pattern that will be used to puncture a punctured sounding message via a wireless channel;
    transmitting, from the transmitting device to the receiving device, the punctured sounding message via the wireless channel, wherein the punctured sounding message omits portions of a signal on the wireless channel based on the puncturing pattern;
    receiving, from the receiving device, a feedback message that includes feedback information based on non-punctured portions of the punctured sounding message.

2. The method of claim 1, wherein the puncturing pattern includes a disallowed subchannel bitmap that identifies which subchannels or resource units (RUs) are punctured.

3. The method of claim 2, wherein the subchannels indicated in the puncturing pattern are identified based on 20 MHz channels in a tone map for a frequency band.

4. The method of claim 2, wherein the RUs indicated in the puncturing pattern are identified based on groups of subcarriers in a tone map for a frequency band.

5. The method of claim 1, further comprising:
    transmitting a management frame that indicates a puncturing pattern for the wireless channel, wherein the management frame is a beacon frame from an access point to one or more stations.

6. The method of claim 1, wherein the feedback information includes beamforming feedback determined by the receiving device based on the punctured sounding message.

7. The method of claim 6, wherein the beamforming feedback is a compressed beamforming metric that is based on an average of signal to noise measurements for the non-punctured portions of the wireless channel.

8. The method of claim 1, further comprising:
    before sending the first message with the puncturing pattern, determining that the receiving device supports puncturing sounding.

9. The method of claim 8, wherein determining that the receiving device supports puncturing sounding includes receiving a punctured sounding capability indicator from the receiving device.

10. The method of claim 1, further comprising:
    determining a beamforming parameter for a subsequent data communication from the transmitting device to the receiving device based, at least in part, on the feedback information.

11. The method of claim 1, wherein the first message is a null data packet announcement (NDPA) and the punctured sounding message is a null data packet (NDP).

12. A method of communication in a wireless network, comprising:
    receiving, from a transmitting device by a receiving device, a first message that indicates a puncturing pattern that will be used to puncture a punctured sounding message via a wireless channel;
    receiving, from the transmitting device by the receiving device, the punctured sounding message via the wireless channel, wherein the punctured sounding message omits portions of a signal on the wireless channel based on the puncturing pattern; and
    transmitting, from the receiving device to the transmitting device, a feedback message that includes feedback information determined based on non-punctured portions of the punctured sounding message.

13. The method of claim 12, wherein the puncturing pattern includes a disallowed subchannel bitmap that identifies which subchannels or resource units are punctured.

14. The method of claim 13, wherein the subchannels indicated in the puncturing pattern are identified either based on 20 MHz channels in a tone map for a frequency band or based on groups of subcarriers in a tone map for a frequency band.

15. The method of claim 12, further comprising:
    determining beamforming feedback based on the punctured sounding message; and
    including the beamforming feedback in the feedback information.

16. The method of claim 15, wherein the feedback information includes a compressed beamforming metric that is based on an average of signal to noise measurements for the non-punctured portions of the wireless channel.

17. The method of claim 12, further comprising:
    transmitting, from the receiving device to the transmitting device, a punctured sounding capability indicator that indicates the receiving device supports punctured sounding.

18. A first wireless device for communication in a wireless network, comprising:
    a processor;
    memory in electronic communication with the processor; and
    instructions stored in the memory and executable by the processor to cause the first wireless device to:
        output for transmission a first message to a second wireless device, the first message indicating a puncturing pattern that will be used to puncture a punctured sounding message via a wireless channel;

output for transmission to the second wireless device the punctured sounding message via the wireless channel, wherein the punctured sounding message omits portions of a signal on the wireless channel based on the puncturing pattern;

obtain from the second wireless device a feedback message that includes feedback information based on non-punctured portions of the punctured sounding message.

19. The first wireless device of claim 18, wherein the puncturing pattern includes a disallowed subchannel bitmap that identifies which subchannels or resource units are punctured.

20. The first wireless device of claim 19, wherein the subchannels indicated in the puncturing pattern are identified either based on 20 MHz channels in a tone map for a frequency band or based on groups of subcarriers in a tone map for a frequency band.

21. The first wireless device of claim 18, wherein the instructions are further executable by the processor to cause the first wireless device to:

output for transmission a management frame that indicates a puncturing pattern for the wireless channel, wherein the management frame is a beacon frame from an access point to one or more stations.

22. The first wireless device of claim 18, wherein the feedback information includes beamforming feedback determined by the second wireless device based on the punctured sounding message.

23. The first wireless device of claim 22, wherein the beamforming feedback is a compressed beamforming metric that is based on an average of signal to noise measurements for the non-punctured portions of the wireless channel.

24. The first wireless device of claim 18, wherein the instructions are further executable by the processor to cause the first wireless device to:

determine a beamforming parameter for a subsequent data communication from the first wireless device to the second wireless device based, at least in part, on the feedback information.

25. The first wireless device of claim 18, wherein the first message is a null data packet announcement (NDPA) and the punctured sounding message is a null data packet (NDP).

26. A first wireless device for communication in a wireless network, comprising:

a processor;

memory in electronic communication with the processor; and instructions stored in the memory and executable by the processor to cause the first wireless device to:

obtain a first message from a second wireless device, wherein the first message indicates a puncturing pattern that will be used to puncture a punctured sounding message via a wireless channel;

obtain from the second wireless device the punctured sounding message via the wireless channel, wherein the punctured sounding message omits portions of a signal on the wireless channel based on the puncturing pattern; and output for transmission to the second wireless device, a feedback message that includes feedback information determined based on non-punctured portions of the punctured sounding message.

27. The first wireless device of claim 26, wherein the puncturing pattern includes a disallowed subchannel bitmap that identifies which subchannels or resource units are punctured.

28. The first wireless device of claim 27, wherein the subchannels indicated in the puncturing pattern are identified either based on 20 MHz channels in a tone map for a frequency band or based on groups of subcarriers in a tone map for a frequency band.

29. The first wireless device of claim 26, wherein the instructions are further executable by the processor to cause the first wireless device to:

determine beamforming feedback based on the punctured sounding message; and include the beamforming feedback in the feedback information.

30. The first wireless device of claim 29, wherein the feedback information includes a compressed beamforming metric that is based on an average of signal to noise measurements for the non-punctured portions of the wireless channel.

* * * * *